(12) United States Patent
Saitoh et al.

(10) Patent No.: US 10,490,936 B2
(45) Date of Patent: Nov. 26, 2019

(54) CONNECTOR COVER AND ASSEMBLY STRUCTURE OF CONNECTOR WITH CONNECTOR COVER

(71) Applicant: YAZAKI CORPORATION, Tokyo (JP)

(72) Inventors: Masayuki Saitoh, Shizuoka (JP); Miyako Okuyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/108,072

(22) Filed: Aug. 21, 2018

(65) Prior Publication Data

US 2019/0067874 A1    Feb. 28, 2019

(30) Foreign Application Priority Data

Aug. 25, 2017    (JP) .................. 2017-162149

(51) Int. Cl.
| | |
|---|---|
| H01R 13/56 | (2006.01) |
| H01R 13/629 | (2006.01) |
| H02G 3/04 | (2006.01) |
| H01R 13/436 | (2006.01) |
| H01R 13/502 | (2006.01) |
| H01R 13/639 | (2006.01) |
| H01R 13/52 | (2006.01) |
| H02G 3/06 | (2006.01) |
| H01R 13/50 | (2006.01) |
| H01R 13/506 | (2006.01) |

(52) U.S. Cl.
CPC ......... H01R 13/629 (2013.01); H01R 13/436 (2013.01); H01R 13/502 (2013.01); H01R 13/5213 (2013.01); H01R 13/56 (2013.01); H01R 13/639 (2013.01); H02G 3/04 (2013.01); H02G 3/0616 (2013.01); *H01R 13/501* (2013.01); *H01R 13/506* (2013.01)

(58) Field of Classification Search
CPC .. H01R 13/629; H01R 13/639; H01R 13/502; H01R 13/436; H01R 13/56; H01R 13/501; H02G 3/04
See application file for complete search history.

(56) References Cited

U.S. PATENT DOCUMENTS 4,884,978 A * 12/1989 Inaba ................. H01R 13/6272
439/352
5,639,256 A *  6/1997 Endo .................... H01R 13/623
439/358
5,947,762 A *  9/1999 Katsuma ............ H01R 13/5202
439/157

(Continued)

FOREIGN PATENT DOCUMENTS

| JP | 10-241779 A | 9/1998 |
| JP | 2013-45509 A | 3/2013 |
| JP | 2017-10754 A | 1/2017 |

*Primary Examiner* — Truc T Nguyen
(74) *Attorney, Agent, or Firm* — Kenealy Vaidya LLP

(57) ABSTRACT

A connector cover includes an opening closing cover. The connector cover is configured to be mounted on a connector so as to cover a part which is drawn out from a wiring member of the connector. A connector includes a lever to be rotated so as to assist fitting with and releasing from a mating connector. The opening closing cover is to open and close an opening on an operation side of a lock portion which locks the lever at a fitting completed position.

4 Claims, 14 Drawing Sheets

(56) References Cited

U.S. PATENT DOCUMENTS

| | | | | |
|---|---|---|---|---|
| 2003/0017739 A1* | 1/2003 | Sawayanagi | ....... | H01R 13/5202 |
| | | | | 439/357 |
| 2003/0181083 A1* | 9/2003 | Kozono | ............... | H01R 13/447 |
| | | | | 439/152 |
| 2004/0192090 A1* | 9/2004 | Flowers | ............. | H01R 13/5812 |
| | | | | 439/157 |
| 2007/0197074 A1* | 8/2007 | Gimbel | ............. | H01R 13/5202 |
| | | | | 439/213 |
| 2010/0081313 A1* | 4/2010 | Komiyama | ...... | H01R 13/62977 |
| | | | | 439/341 |
| 2011/0021048 A1* | 1/2011 | Sakamaki | .......... | H01R 13/4361 |
| | | | | 439/157 |
| 2011/0312198 A1* | 12/2011 | Komiyama | ...... | H01R 13/62911 |
| | | | | 439/157 |
| 2013/0059457 A1* | 3/2013 | Hori | ................ | H01R 13/62933 |
| | | | | 439/270 |
| 2013/0102168 A1* | 4/2013 | Kobayashi | ......... | H01R 13/5213 |
| | | | | 439/141 |
| 2013/0237078 A1* | 9/2013 | Ikeda | .................... | H01H 9/102 |
| | | | | 439/157 |
| 2017/0149174 A1* | 5/2017 | Goletto | ............ | H01R 13/62933 |
| 2017/0229805 A1* | 8/2017 | Yoshida | ............. | H01R 13/5213 |
| 2017/0288342 A1* | 10/2017 | Nicolas | ............. | H01R 13/6271 |
| 2018/0090881 A1* | 3/2018 | Tyler | ................. | H01R 13/5213 |

\* cited by examiner

CONNECTOR COVER AND ASSEMBLY STRUCTURE OF CONNECTOR WITH CONNECTOR COVER

CROSS REFERENCE TO RELATED APPLICATIONS

This application claims priority from Japanese Patent Application No. 2017-162149 filed on Aug. 25, 2017, the entire contents of which are incorporated herein by reference.

The present invention relates to a connector cover mounted on a connector, and a structure for assembling a connector with a connector cover.

In the related art, for protecting a wiring member such as an electric wire drawn out from a connector, a connector cover covering a portion where the wiring member is drawn out from the connector is mounted on the connector (see, for example, the patent document 1: JP-A-2017-10754 and the patent document 2: JP-A-2013-45509).
[Patent Document 1] JP-A-2017-10754
[Patent Document 2] JP-A-2013-45509

According to a related art, in a connector cover, an opening is formed to release fitting with a connector, so that high-pressure washing water flows through the opening and directly hits a waterproof sealing member that seals a wiring member, such as an electric wire, drawn out from the connector or an outlet of the wiring member in a waterproof manner, whereby the wiring member or the waterproof sealing member may be undesirably damaged, and so that a releasing operation portion may be inadvertently operated through the opening, whereby the fitting may be inadvertently released.

Further, according to a related art, in a lever-type connector, high-pressure washing water flows through a finger insertion space for unlocking a lock mechanism that locks the rotation of a lever in a properly fitted state and directly hits a waterproof sealing member that seals a wiring member, such as an electric wire, drawn out from the connector or an outlet of the wiring member in a waterproof manner, whereby the wiring member or the waterproof sealing member may be undesirably damaged and in that the lock mechanism may be inadvertently operated through the finger insertion space, whereby the fitting may be inadvertently released.

SUMMARY

One or more embodiments provide a connector cover, and a structure for assembling a connector with a connector cover in which it is possible to prevent a waterproof sealing member for sealing a wiring member drawn out from the connector or an outlet of the wiring member in a waterproof manner from being damaged by high-pressure washing water, and to prevent fitting with a mating connector from being inadvertently released, even when the high-pressure washing water is strongly sprayed.

In an aspect (1), a connector cover includes an opening closing cover. The connector cover is configured to be mounted on a connector so as to cover a part of the connector form which a wiring member is drawn out. A connector includes a lever to be rotated so as to assist fitting with and releasing from a mating connector. The opening closing cover is to open and close an opening on an operation side of a lock portion which locks the lever at a fitting completed position.

In an aspect (2), an assembly structure of a connector with a connector cover includes a connector and a connector cover. The connector includes a lever to be rotated so as to assist fitting with and releasing from a mating connector and covers a periphery of a lock portion which locks the lever at a fitting completed position. The connector cover is mounted on the connector so as to cover a part of the connector from which a wiring member is drawn out, and the connector cover includes an opening closing cover which is to open and close an opening on an operation side of the lock portion.

In an aspect (3), the lock portion includes an elastic arm portion having a free end on an end of a drawing direction of the wiring member of the connector. The elastic arm portion is elastically deformed from and restored to a fixed end of the elastic arm portion as a fulcrum so that the lever is locked and unlocked. The connector includes an arm excessive displacement preventing wall portion that is erected in a shape of a bridge to surround the free end from both sides to an upper surface, so as to prevent excessive displacement of the elastic arm portion. The connector cover includes a pair of misalignment preventing ribs that are arranged to sandwich the arm excessive displacement preventing wall portion between both side end surfaces when the connector cover is completely mounted on the connector, so as to prevent deviation of the connector cover from the connector. The opening closing cover is fixed to the pair of misalignment preventing ribs to sandwich the pair of misalignment preventing ribs in a direction that the misalignment preventing ribs face each other.

In an aspect (4), the arm excessive displacement preventing wall portion is disposed between the lever locked by the lock portion at a fitting completed position and the opening closing cover and is in contact with the lever and the opening closing cover.

According to the aspect (1), the connector cover is mounted on a connector to cover a portion of a wiring member drawn out from the connector provided with a lever for assisting fitting with and releasing from a mating connector by rotation. The connector cover includes an opening closing cover that may open and close an opening formed on an operation side of a lock portion that locks the lever at a position where the fitting operation is completed. Thus, even when high-pressure washing water is strongly sprayed onto the connector, it is possible to prevent the high-pressure washing water flowing through the opening from being strongly sprayed onto a sealing member that seals the wiring member drawn out from the connector in the connector cover or the outlet of the wiring member in a waterproof manner. As a result, even when the high-pressure washing water is strongly sprayed onto the connector, it is possible to prevent a waterproof sealing member that seals the wiring member drawn out from the connector or the outlet of the wiring member in a waterproof manner from being damaged by the high-pressure washing water, while preventing fitting with the mating connector from being inadvertently released.

According to the aspects (2) to (4), the assembly structure of the connector with the connector cover is provided with a lever for assisting fitting with and releasing from a mating connector by rotation. The assembly structure includes a connector covering a periphery of a lock portion that locks an associated lever at a position where the associated lever is fitted, and a cover that is mounted on the connector to cover a portion of a wiring member drawn out from the connector. The assembly structure includes an opening closing cover that may open and close an opening formed on an operation side of the lock portion. Thus, even when high-pressure washing water is strongly sprayed onto the connector, it is possible to prevent the high-pressure washing water flowing through the opening from being strongly sprayed onto a sealing member that seals the wiring member drawn out from the connector in the connector cover or the outlet of the wiring member in a waterproof manner. Moreover, the periphery of the lock portion may be covered over a wide range together with the connector cover. As a result, even when the high-pressure washing water is strongly sprayed onto the connector, it is possible to prevent a waterproof sealing member that seals the wiring member drawn out from the connector or the outlet of the wiring member in a waterproof manner from being damaged by the high-pressure washing water, while preventing fitting with the mating connector from being inadvertently released.

DETAILED DESCRIPTION

Hereinafter, a connector cover, and a structure for assembling a connector with a connector cover according to the preferred embodiment of the invention will be described in detail with reference to the accompanying drawings.

Figure 1:
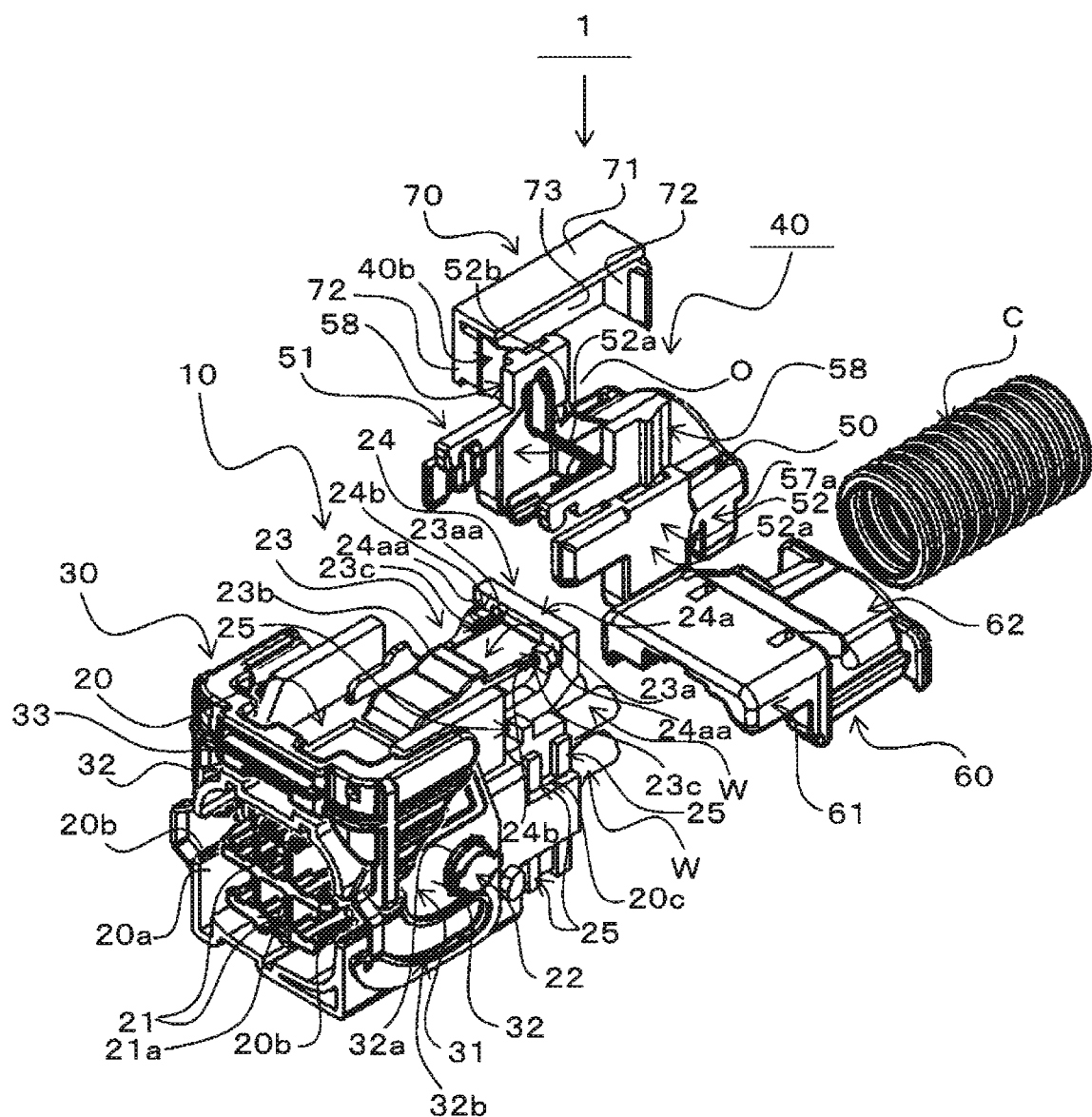
FIG. 1 is an exploded perspective view illustrating an assembly structure of a connector with a connector cover according to a first embodiment of the invention.
Figure 2A:
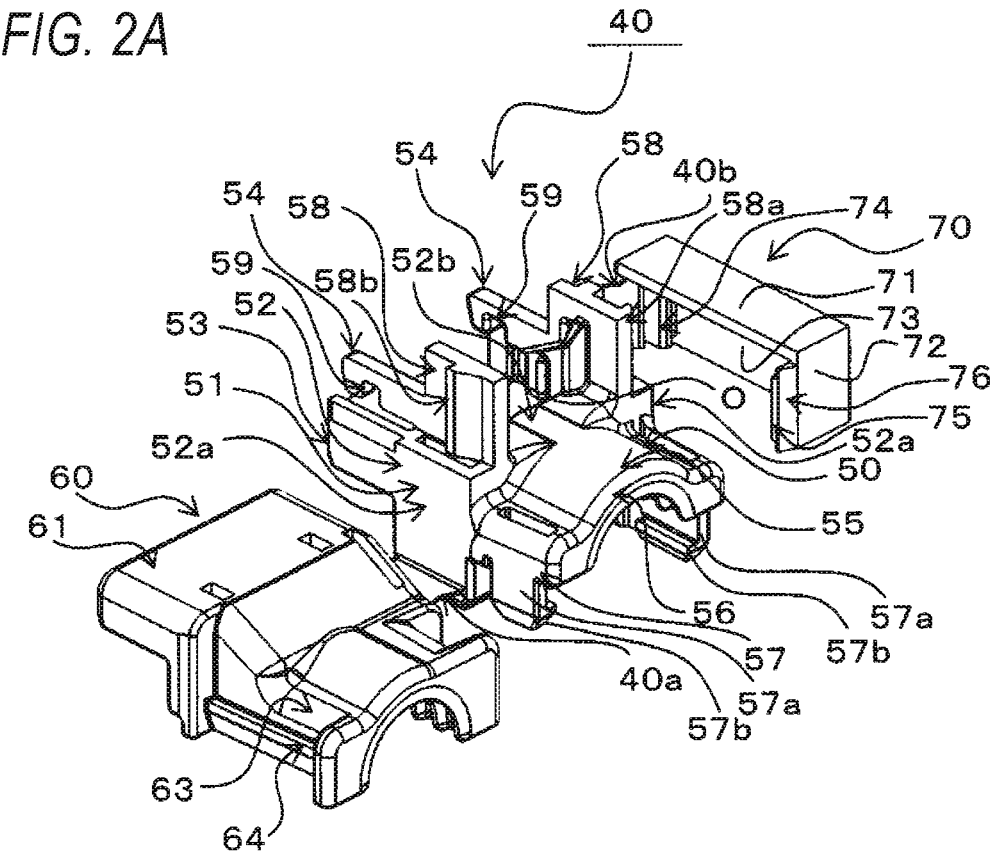
FIGS. 2A and 2B are development views of the connector cover according to the first embodiment of the invention as viewed from two directions.
Figure 2B:
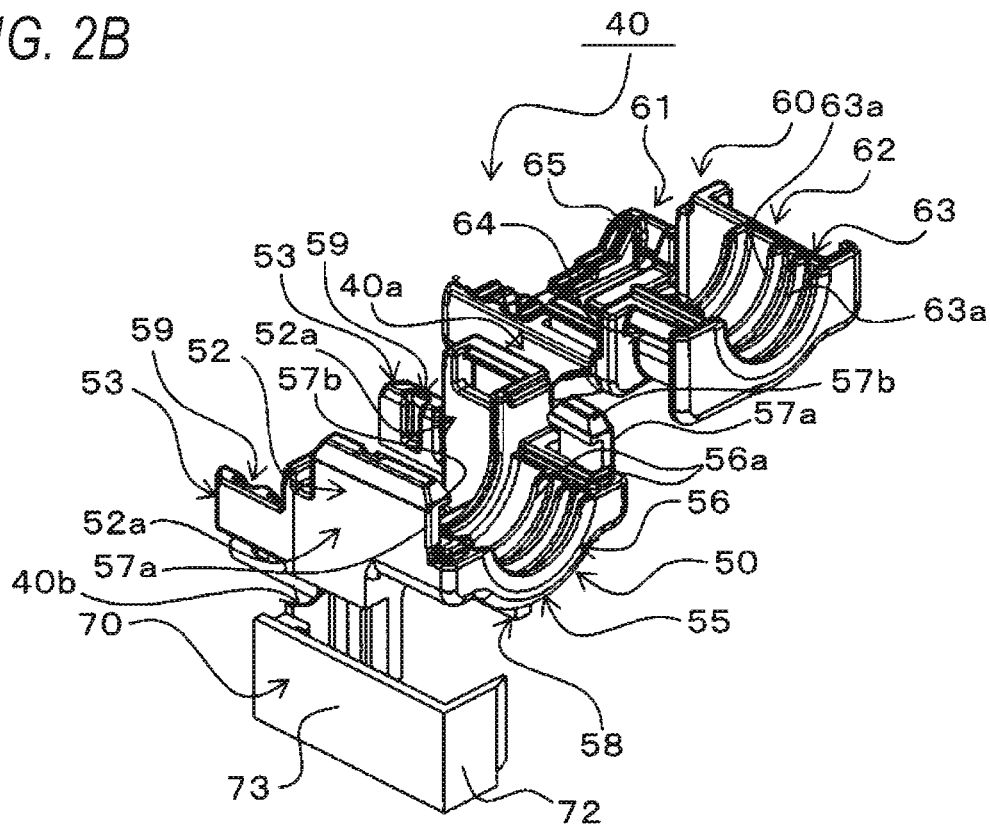
Figure 3A:
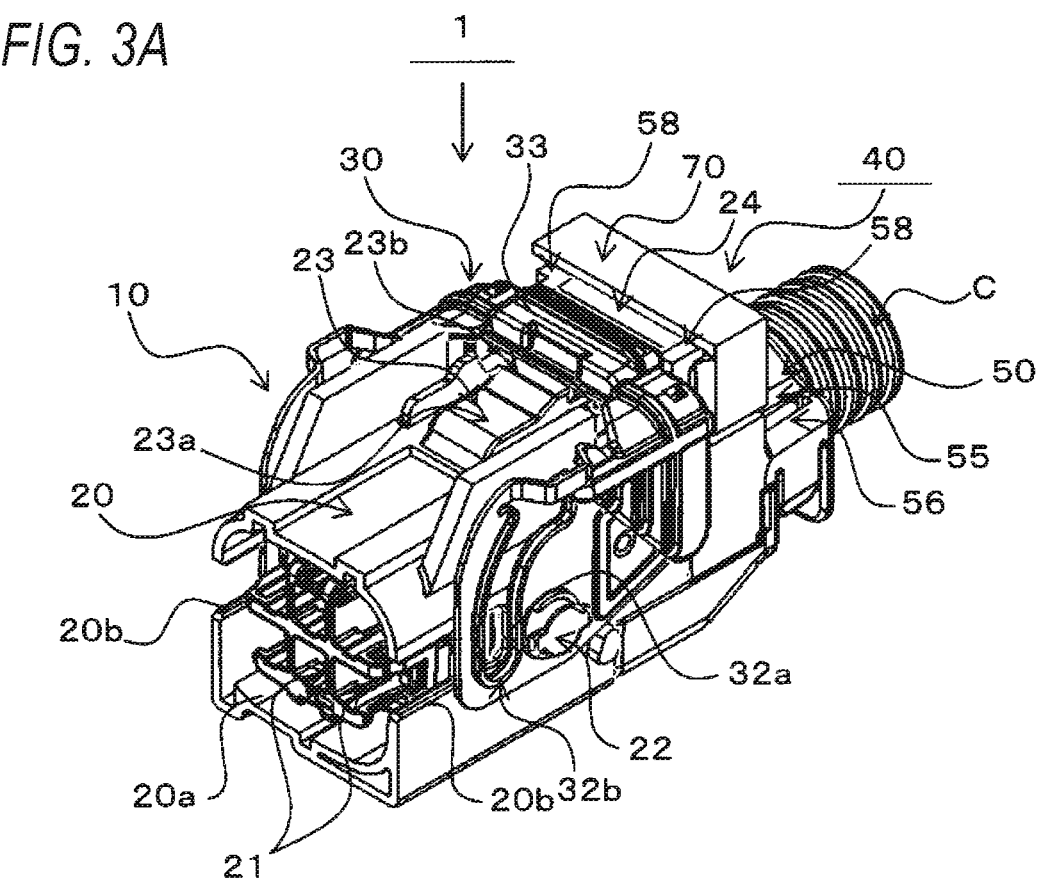
FIGS. 3A and 3B are views of the connector equipped with the connector cover as viewed from two directions.
Figure 3B:
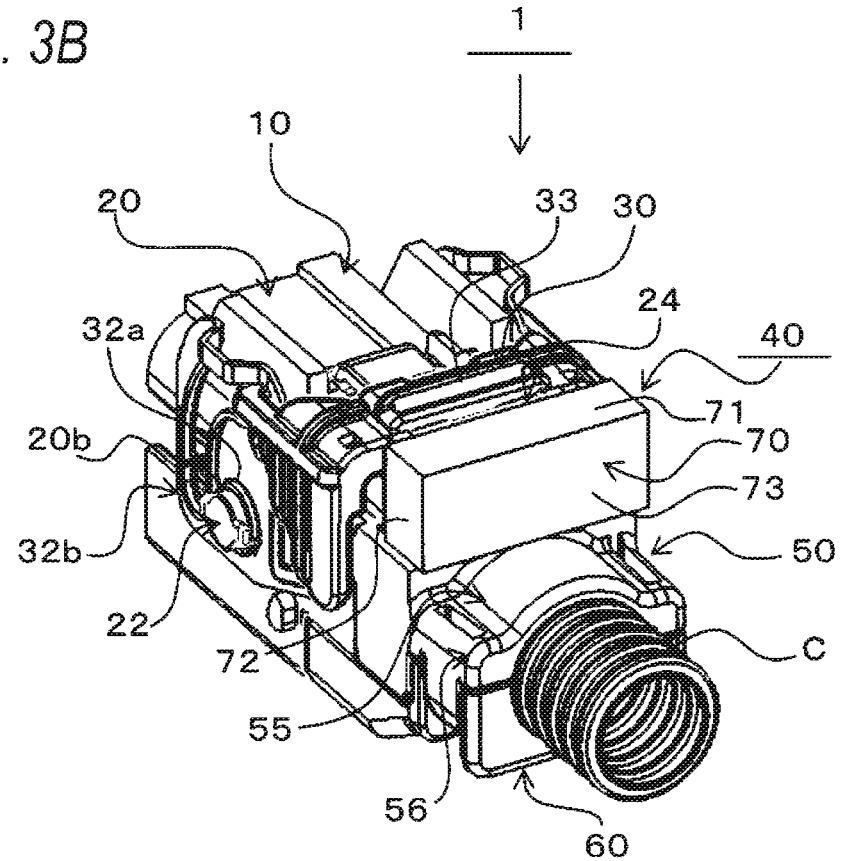
Figure 4:
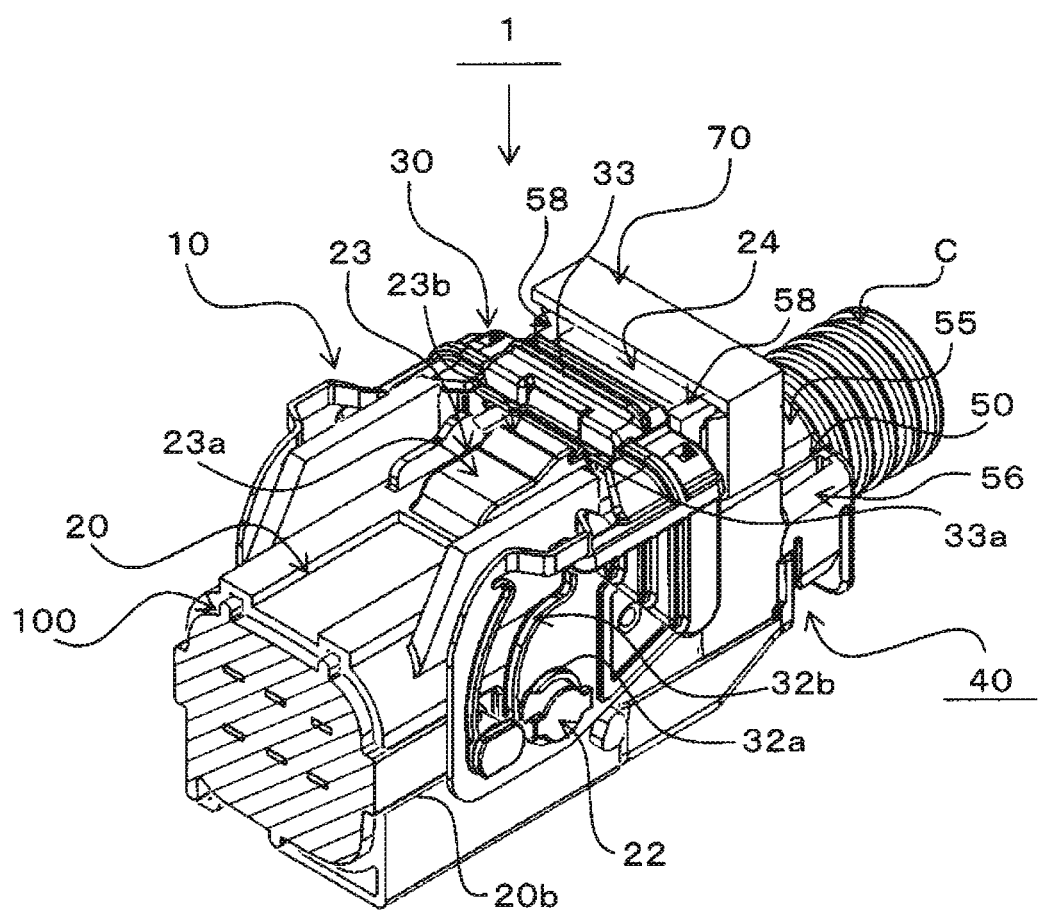
FIG. 4 is a view illustrating a state where the connector equipped with the connector cover is fitted with a mating connector.
Figure 5A:
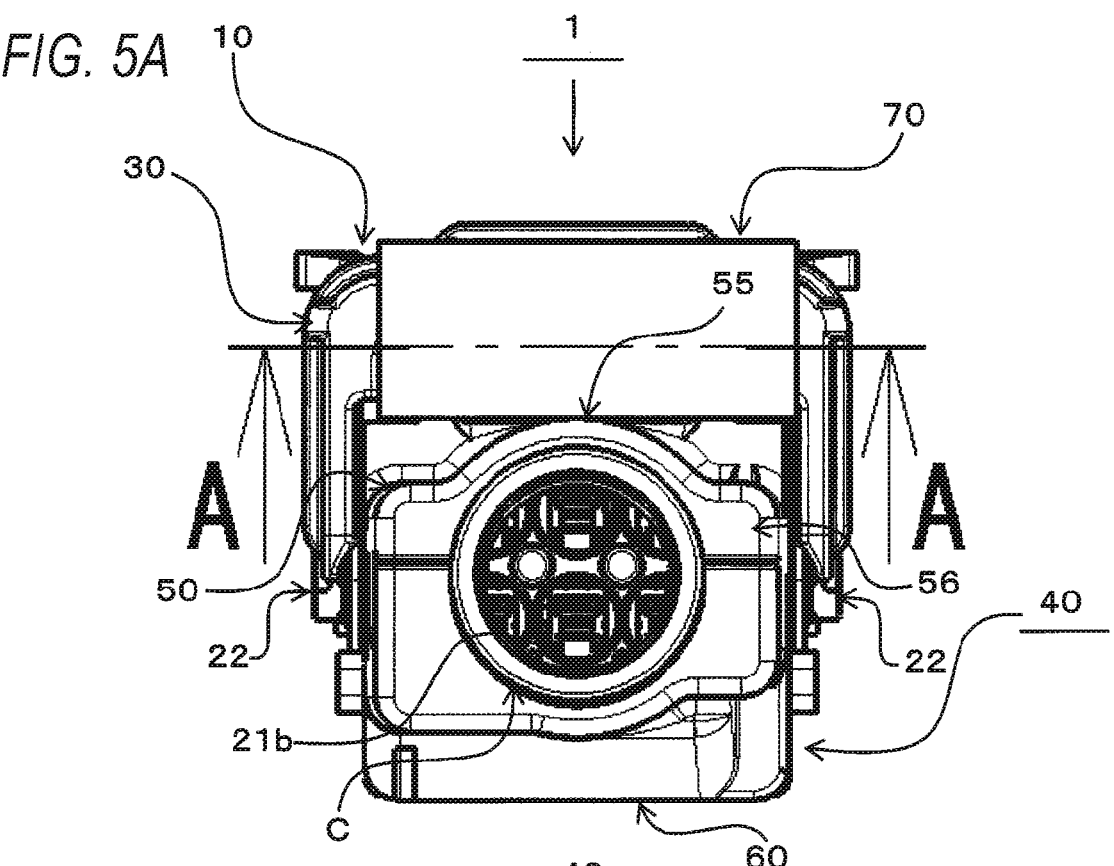
FIG. 5A is a view illustrating the connector equipped with the connector cover as viewed from a side from which a wiring member is drawn out.

FIG. 1 is an exploded perspective view illustrating an assembly structure 1 of a connector with a connector cover according to a first embodiment of the invention. FIGS. 2A and 2B are development views of the connector cover 40 according to the first embodiment of the invention as viewed from two directions. FIGS. 3A and 3B are views of the connector 10 equipped with the connector cover 40 as viewed from two directions. FIG. 4 is a view illustrating a state where the connector 10 equipped with the connector cover 40 is fitted with a mating connector 100. FIG. 5A is a view illustrating the connector 10 equipped with the connector cover 40 as viewed from a side from which a wiring member W is drawn out, and FIG. 5B is a cross-sectional view taken along line A-A of the connector 10 equipped with the connector cover 40 shown in FIG. 5A.

Figure 5B:
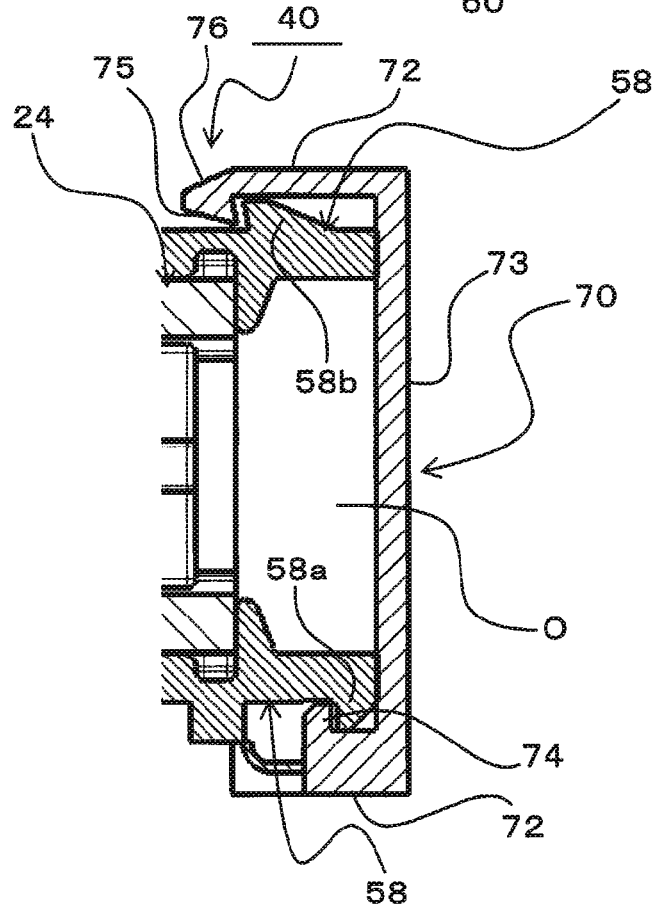
FIG. 5B is a cross-sectional view taken along line A-A of the connector equipped with the connector cover shown in FIG. 5A.

Meanwhile, a terminal accommodated in a connector housing and an electric wire connected to the terminal are not shown in FIGS. 5A and 5B.

The assembly structure 1 of the connector with the connector cover according to the first embodiment of the invention is mounted on a vehicle, for example.

The assembly structure 1 of the connector with the connector cover includes the connector 10, the connector cover 40, and a corrugated tube C.

First, the connector 10 will be described.

The connector 10 includes a connector housing 20, a lever 30, a terminal (not shown) connected to a termination point of an electric wire W.

The connector housing 20 is made of an insulating resin material in the shape of a block, with a plurality of terminal accommodating chambers 21 for accommodating a plurality of terminals being provided in the connector housing to be partitioned from each other.

The connector housing 20 has a tubular shape in which an end on a front side in a fitting direction with the mating connector 100 is formed with an insertion port 20a into which the mating connector 100 is inserted, and each terminal accommodating chamber 21 includes in the insertion port 20a a mating terminal insertion port 21a into which the mating terminal 111 of the mating connector 100 is inserted, such that the mating terminal insertion port faces the insertion port 20a.

In the connector housing 20, the wiring member, e.g., the electric wire W is drawn out from an end on a rear side in the fitting direction with the mating connector 100. To be more specific, in the connector housing 20, the electric wire W connected to the terminal is drawn out from a terminal insertion port 21b (see FIG. 5A) of the terminal of each terminal accommodating chamber 21 formed on an end on a rear side in a fitting direction with the mating connector 100.

In the first embodiment, a waterproof sealing member such as a rubber stopper (not shown) as the wiring member is mounted on the termination point of the electric wire W, and the waterproof sealing member seals each terminal insertion port 21b in a waterproof manner in a state where the electric wire W is drawn.

Further, the connector housing 20 includes a pair of rotating shafts 22 and 22 that project from both side surfaces of the connector housing 20 to support the rotation of the lever 30, a lock portion 23 that locks the lever 30 to a position where the fitting is completed, an arm excessive displacement preventing wall portion 24 that prevents an excessive displacement of an elastic arm portion 23a which is a component of the lock portion 23 and will be described later, and a plurality of housing-side engaging portions 25 that engage the connector cover 40.

The lock portion 23 includes the elastic arm portion 23a that is provided on an upper surface of the connector housing 20 in the shape of an arm, and a lock protrusion 23b that protrudes from the upper surface of the elastic arm portion 23a.

The elastic arm portion 23a is provided to extend in the shape of an arm, and includes a free end 23aa directed from a fixed end connected to the upper surface of the connector housing 20 to an end of a side from which the wiring member W of the connector 10 is drawn out.

On the free end 23aa of the elastic arm portion 23a, a pair of abutting protruding portions 23c and 23c protruding in a width direction are provided (see FIG. 1).

When the free end 23aa of the elastic arm portion 23a is displaced excessively upward, the pair of abutting protrusions 23c and 23c abuts against a pair of stopper portions 24b, 24b of the arm excessive displacement preventing wall portion 24, which will be described later, thus preventing the excessive displacement of the elastic arm portion 23a.

The lock protrusion 23b has a hook shape in cross section so that a locking piece 33a (see FIG. 4) of the lever 30 that is rotated to a position where the fitting has been completed is caught.

To prevent excessive displacement of the elastic arm portion 23a, the arm excessive displacement prevention wall portion 24 is a wall that is erected in the shape of a bridge on the upper surface of the connector housing 20 to surround the free end 23aa of the elastic arm portion 23a from an upper surface to both side surfaces thereof.

The arm excessive displacement preventing wall portion 24 includes a bridge-shaped wall body 24a constituting a body of the wall, and a pair of stopper portions 24b, 24b provided along the surfaces of both legs of the wall body 24a.

The wall body 24a has a surface that comes into contact with the lever 30 rotated to a position where a surface 24aa facing away from a side from which the wiring member W is drawn has been fitted.

When the free end 23aa of the elastic arm portion 23a is excessively displaced upwards, the pair of stopper portions 24b, 24b prevents the excessive displacement of the elastic arm portion 23a by abutting against the pair of abutting protrusions 23c and 23c at an upper position, respectively.

Each of the housing-side engaging portions 25 protrudes from an upper surface or a side surface of a rear end of the connector housing 20, in particular, a bottom surface, to engage with a plurality of cover-side engaging portions 59 and 65 that are provided on the connector cover 40 and will be described later.

Further, a pair of grooves 20b and 20b is formed in the connector housing 20 to be deeply cut inwards from the insertion port 20a.

The pair of grooves 20b and 20b is arranged at positions aligned with inlets of a pair of cam grooves 32b and 32b of the lever 30 that are in a standby position before fitting with the mating connector 100.

The lever 30 includes a lever body portion 31 that is a portion rotatably supported by a pair of rotating shafts 22 and 22 provided on both side surfaces of the connector housing 20, and a lever operating portion 33 that is a portion operated by a worker.

The lever body portion 31 is a portion that is mounted on the connector housing 20 to be attached to both side surfaces of the connector housing 20, and includes a pair of lever-body wall portions 32 and 32 that are portions rotated while being in sliding contact with both side surfaces of the connector housing 20 with the pair of rotating shafts 22 and 22 as fulcrums.

Each lever-body wall portion 32 includes a rotating-shaft hole 32a into which each rotating shaft 22 is inserted, and a cam groove 32b into which each of cams 110 and 110 protruding from both side surfaces of the mating connector 100 is fitted.

The lever operating portion 33 is provided to bridge a gap between a pair of lever-body wall portions 32 and 32 at the ends of the pair of lever-body wall portions 32 and 32.

The lever operating portion 33 is provided with the locking piece 33a which locks the lever 30 to a position where the lever 30 has been fitted by being caught by the lock protrusion 23b of the lock portion 23, in a state where rotation is performed to the position where fitting has been completed.

In such a lever 30, in the standby state before fitting with the mating connector 100, the lever operating portion 33 is arranged around the insertion port 20a of the connector housing 20. Thus, if the rotation is performed around the rotating shafts 22 and 22 to the position where fitting has been completed by operating the lever operating portion 33, the periphery of the lock portion 23 for locking the lever 30 is covered.

Next, the connector cover 40 will be described.

The connector cover 40 is made of an insulating resin material, and includes upper and lower covers 50 and 60 connected to each other via a hinge portion 40a, and an opening closing cover 70 connected to the upper cover 50 via a hinge portion 40b.

The upper cover 50 and the lower cover 60 are fixedly connected to each other by overlapping opening surfaces of the upper and lower covers while sandwiching the end on the wire drawing side of the connector housing 20 and the end of the corrugated tube C therebetween.

The upper cover 50 includes a connecting portion 51 that is a portion connected to the rear end of the connector housing 20, a tube accommodating portion 55 that accommodates the end of the corrugated tube C, and a pair of misalignment preventing ribs 58 and 58.

The connecting portion 51 includes a connecting body portion 52 that is connected to a rear of the connector housing 20 while coming into contact with an end surface of the wire drawing side of the connector housing 20, a pair of first connecting pieces 53 and 53 that protrude in the shape of a piece from the connecting body portion 52 towards a front, and a pair of second connecting pieces 54 and 54 that protrude in the shape of a piece from each of the misalignment preventing ribs 58 and 58 towards the front.

The connecting body portion 52 includes a pair of side cover walls 52a and 52a that are disposed behind sidewalls of the connector housing 20, and a ceiling cover wall 52b that bridges a gap between upper ends of the pair of side cover walls 52a and 52a.

The pair of first connecting pieces 53 and 53 protrudes from front edge surfaces of the respective side cover walls 52a.

Each of the first connecting pieces 53 is formed such that the outer surface of the first connecting piece 53 is flush with the outer surface of the connector housing 20 around the first connecting piece 53 and is fitted into a fitting concave portion 20c (see FIG. 1) formed concavely on the outer surface of the sidewall of the connector housing 20.

Two ridges extending along a direction in which the connector cover 40 is mounted on the connector housing 20 are provided as the housing-side engaging portions 25 in each fitting concave portion 20c.

Two grooves serving as the cover-side engagement portions 59 engaging with the two ridges are formed in each of the first connection pieces 53 (see FIGS. 2A and 2B).

The pair of second connecting pieces 54 and 54 protrudes from the front edge surfaces of the misalignment preventing ribs 58 and 58.

Each of the second connecting pieces 54 is a portion that is arranged to cause a lower end surface thereof to come into contact with the upper edge surface of the wall forming the bottom surface of the fitting concave portion 20c.
Meanwhile, a protrusion as the housing-side engaging portion 25 is provided on the upper edge surface of the wall forming the bottom surface of the fitting concave portion 20c.

On the lower end surface of each second connecting piece 54, a concave portion as a cover-side engaging portion 59 engaging with a protrusion as the housing-side engaging portion 25 is formed.

As illustrated in FIGS. 2A and 2B, the tube accommodating portion 55 includes an accommodating body 56 that is a portion to accommodate the end of the corrugated tube C, and a pair of coupling lock portions 57 and 57 that lock a coupling state with the tube accommodating portion 62 of the lower cover 60.

The accommodating body 56 includes, on an inner surface of an arc-shaped section corresponding to the shape of an outer circumferential surface of the corrugated tube C, concave portions that are alternately and repeatedly arranged in the longitudinal direction of the corrugated tube C side by side and ridges 56a of convex portions that are fitted into the concave portions.

The pair of coupling lock portions 57 have elastic arm portions 57a that protrude from both ends in a circumferential direction of the accommodating body 56, and coupling lock protrusions 57b that are provided on tips of the elastic arm portions 57a.

The pair of misalignment preventing ribs 58 and 58 is erected on a ceiling cover wall 52b of the connecting body portion 52 to face each other. Thus, by disposing the arm excessive displacement preventing wall portion 24 to sandwich it between both end surfaces in a state where the connector cover 40 is mounted on the connector 10, it is possible to prevent a position at which the connector cover 40 is attached to the connector 10 from being deviated from a predetermined position.

The lower cover 60 includes a connecting portion 61 that is connected to the rear end of the connector housing 20, and a tube accommodating portion 62 that accommodates the end of the corrugated tube C.

The connecting portion 61 is connected to the rear of the connector housing 20 in the state of coming into contact with the end surface on the wire drawing side of the connector housing 20.

The connecting portion 61 includes a concave portion as the cover-side engaging portion 65 that engages with the ridge formed on a lower portion of the connector housing 20.

As illustrated in FIGS. 2A and 2B, the tube accommodating portion 62 includes an accommodating body 63 that is a portion to accommodate the end of the corrugated tube C, and a pair of coupling lock protrusions 64 and 64 that engage with the pair of coupling lock protrusions 57b and 57b provided on the tube accommodating portion 55 of the upper cover 50.

The accommodating body 63 includes, on the inner surface of an arc-shaped section corresponding to the shape of the outer circumferential surface of the corrugated tube C, concave portions that are alternately and repeatedly arranged in the longitudinal direction of the corrugated tube C side by side and ridges 63a of convex portions that are fitted into the concave portions.

The upper cover 50 and the lower cover 60 are connected to each other via the hinge portion 40a provided between the connecting portions 51 and 61. Thus, the hinge portion 40a is deformed so that the opening surfaces of the connecting portions 51 and 61 and the tube accommodating portions 55 and 62 are moved to overlap each other, and the pair of coupling lock protrusions 57b and 57b and the pair of coupling lock protrusions 64 and 64 engage with each other to be fixed in the coupled state.

The opening closing cover 70 is connected to the upper cover 50 via the hinge portion 40b to open and close the opening O formed on the operation side of the lock portion 23 that locks the lever 30 at the position where fitting has been completed.

The opening closing cover 70 includes a ceiling wall 71, a pair of sidewalls 72 and 72 that are erected on both ends of the ceiling wall 71 to face each other, a rear end wall 73 that is provided on a rear end of the ceiling wall 71, and two closing-cover-side lock protrusions 74 and 75 (see FIGS. 2A and 2B) that are locked to the pair of misalignment preventing ribs 58 and 58 to be fixed.

The hinge portion 40b is provided to connect between the sidewall 72 of the opening closing cover 70 and the misalignment preventing rib 58.

Of the two closing-cover-side lock protrusions 74 and 75, one closing-cover-side lock protrusion 74 is provided on the inner wall surface of the sidewall 72 connected to the hinge portion 40b, so that it engages with the rib-side lock protrusion 58a protruding from the rear end of the misalignment preventing rib 58 connected to the hinge portion 40b.

Of the two closing-cover-side lock protrusions 74 and 75, the other closing-cover-side lock protrusion 75 is provided on an inner surface of a projection 76 projecting in the shape of a piece from the sidewall 72 facing the sidewall 72 connected to the hinge portion 40b towards the front.

In the opening closing cover 70, the two closing-cover-side lock protrusions 74 and 75 engage with the two rib-side lock protrusions 58a and 58b of the pair of misalignment preventing ribs 58 and 58, so that a part of the pair of sidewalls 72 and 72 overlaps with the side surface of the pair of displacement preventing ribs 58 and 58 on a rear end surface, and the rear end wall 73 is brought into contact with the rear end surfaces of the pair of displacement preventing ribs 58 and 58, whereby the ceiling wall 71 is fixed to the pair of displacement preventing ribs 58 and 58 while overlapping with the upper end surfaces of the pair of displacement preventing ribs 58 and 58 on a rear end surface.

By fixing the opening closing cover 70 to the upper cover 50 of the connector cover 40 mounted on the connector housing 20, the opening O formed on the operation side of the lock portion 23 for locking the lever 30 at the position where fitting has been completed is blocked.

Further, as illustrated in FIG. 5B, the opening closing cover 70 is fixed to the pair of misalignment preventing ribs 58 and 58 to be sandwiched therebetween in the state where the misalignment preventing ribs 58 and 58 face each other. Therefore, the opening closing cover 70 is designed to prevent the pair of misalignment preventing ribs 58 and 58 from being deformed to increase an interval therebetween.

In such an assembly structure 1 of the connector with the connector cover, the arm excessive displacement preventing wall portion 24 is disposed between the lever 30 locked by the lock portion 23 at the fitting completed position and the opening closing cover 70 fixed to the pair of misalignment preventing ribs 58 and 58 to come into contact with the lever 30 and the opening closing cover 70, respectively.

Therefore, it is possible to cover the opening O formed on the operation side of the lock portion 23 for locking the lever 30 and the periphery of the lock portion 23 by the lever 30, the opening closing cover 70, and the arm excessive displacement preventing wall portion 24.

That is, the assembly structure 1 of the connector with the connector cover may cover the opening O formed on the operation side of the lock portion 23 and the periphery of the lock portion 23 over a wider range, by three components, namely, the lever 30, the opening closing cover 70, and the arm excessive displacement preventing wall portion 24.

Next, a step of fitting the connector 10 with the mating connector 100 after mounting the connector cover 40 on the connector 10 will be described with reference to FIGS. 6A to 6F.

FIGS. 6A to 6F are views illustrating a state of closing the opening closing cover 70 and a state of fitting the connector 10 and the mating connector 100 by operating the lever, and figures aligned to the right and left are views of the same state as viewed from different directions.

First, a worker mounts the upper cover 50 on the rear end of the connector housing 20.

Here, if the worker mounts the upper cover 50 on the connector housing 20 by engaging the plurality of housing-side engaging portions 25 provided on the rear end of the connector housing 20 with the plurality of cover-side engaging portions 59 provided on the upper cover 50, the pair of misalignment preventing ribs 58 and 58 is disposed to sandwich the arm excessive displacement preventing wall portion 24 from both side end surfaces.

Thereafter, the worker puts the end of the corrugated tube C accommodating the wiring member W in the tube accommodating portion 55 while putting the wiring member W in the upper cover 50.

Thereafter, the worker rotates the lower cover 60 connected to the upper cover 50 by the hinge portion 40a around the hinge portion 40a, mounts the lower cover on the rear end of the connector housing 20 from a lower side, and then fixedly couples it to the upper cover 50.

Here, the worker mounts the lower cover 60 on the connector housing 20 by engaging the plurality of housing-side engaging portions 25 provided on the rear end of the connector housing 20 with the plurality of cover-side engaging portions 65 provided on the lower cover 60.

Further, the worker fixedly couples the upper cover 50 with the lower cover 60 by coupling the pair of coupling lock protrusions 57b and 64 provided on the upper cover 50 and the lower cover 60, respectively.

After mounting the connector cover 40 on the connector 10, as illustrated in FIGS. 6A, 6B, 6C and 6D, the worker rotates the opening closing cover 70 connected to the upper cover 50 via the hinge portion 40b around the hinge portion 40b to fix it to the upper cover 50.

Here, the worker engages the two closing-cover-side lock protrusions 74 and 75 of the opening closing cover 70 with the two rib-side lock protrusions 58a and 58b of the pair of misalignment preventing ribs 58 and 58, thus fixing the opening closing cover 70 to the pair of misalignment preventing ribs 58 and 58.

By fixing the opening closing cover 70 to the upper cover 50 in this way, the opening O formed on the operation side of the lock portion 23 for locking the lever 30 at the fitting completed position is blocked.

Figure 6A:
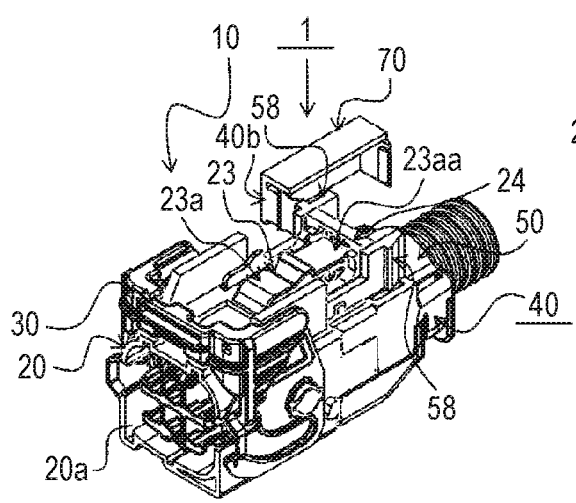
FIGS. 6A to 6F are views illustrating a state of closing an opening closing cover and a state of fitting the connector and the mating connector by operating a lever, and figures aligned to the right and left are views of the same state as viewed from different directions.
Figure 6B:
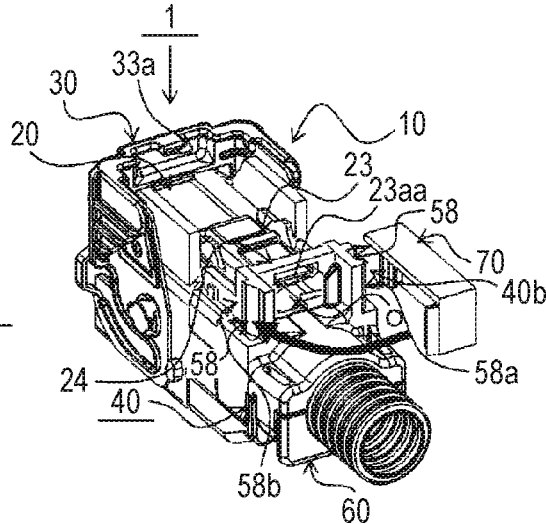
Figure 6C:
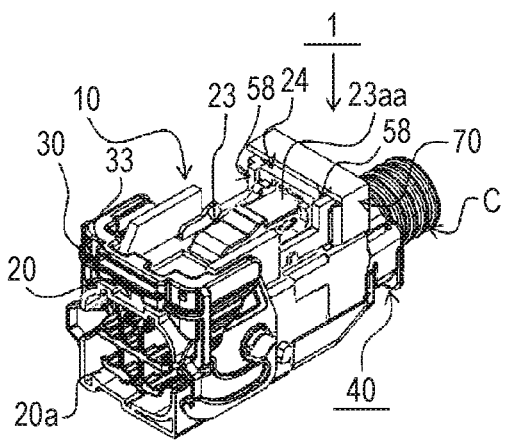
Figure 6D:
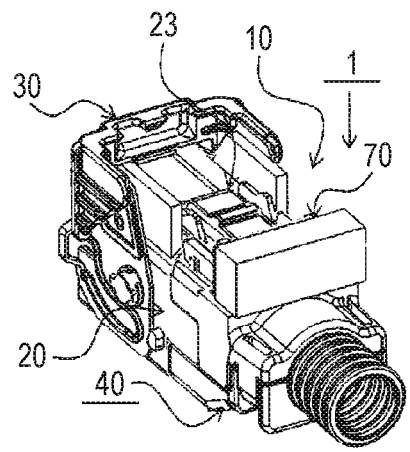
Figure 6E:
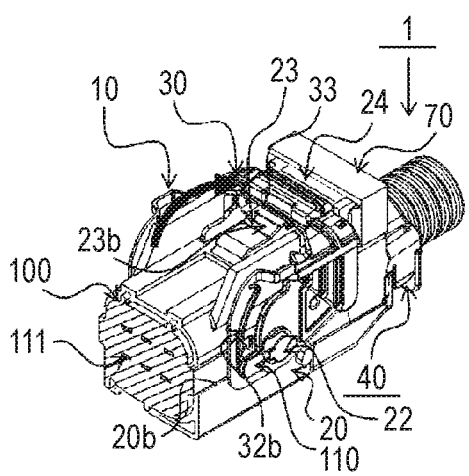
Figure 6F:
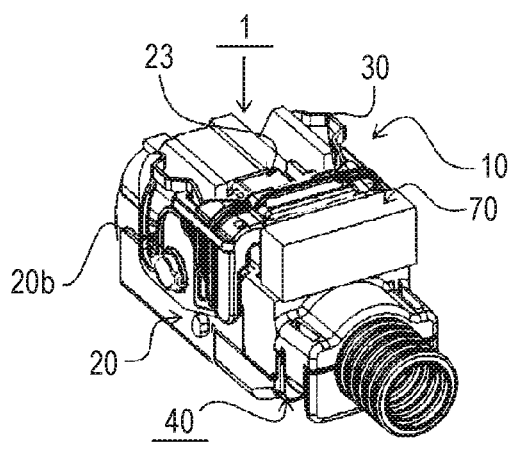

Finally, as illustrated in FIGS. 6E and 6F, the worker rotates the lever 30 at the fitting completed position, so that the connector 10 and the mating connector 100 are fitted with each other.

Here, the worker puts the mating connector 100 into the insertion port 20a of the connector housing 20 until the pair of cams 110 and 110 of the mating connector 100 is fitted through the pair of grooves 20b and 20b formed on the connector housing 20 into inlets of the pair of cam grooves 32b and 32b of the lever 30, and then rotates the lever operating portion 33 to the fitting completed position where locking is performed by the lock portion 23.

If the lever operating portion 33 is located at the fitting completed position, the locking piece 33a is caught by the lock protrusion 23b of the lock portion 23, so that the lever operating portion 33 is locked at the fitting completed position.

Meanwhile, if the lever 30 is rotated to the fitting completed position by the worker, the mating connector 100 moves to the fitting completed position in the connector housing 20 while the pair of cams 110 and 110 is moved along the groove 20b under external force for movement by the corresponding cam groove 32b.

Further, if the lever operating portion 33 is located at the fitting completed position, the opening O formed on the operation side of the lock portion 23 locking the lever 30 and the periphery of the lock portion 23 are covered in a wide range by three components that function respectively as the lever 30, the opening closing cover 70, and the arm excessive displacement preventing wall portion 24, so that the arm excessive displacement preventing wall portion 24 is brought into contact with the lever 30 and the opening closing cover 70, respectively, between the lever 30 and the opening closing cover 70.

Next, a step of releasing the mating connector 100 from the connector 10 will be described.

First, the worker releases the two closing-cover-side lock protrusions 74 and 75 of the opening closing cover 70 from the two rib-side lock protrusions 58a and 58b of the pair of misalignment preventing ribs 58 and 58, and rotates the opening closing cover 70 in a reverse direction when fixed to the pair of misalignment preventing ribs 58 and 58 around the hinge portion 40b, thus opening the opening O formed on the operation side of the lock portion 23.

Thereafter, the worker inserts a finger or a jig through the opening O, and bends the elastic arm portion 23a of the lock portion 23 in a direction in which the lever 30 is unlocked.

Meanwhile, when the elastic arm portion 23a is deflected in the direction opposite to the direction in which the lock is released by external force, the arm excessive displacement preventing wall portion 24 prevents the excessive displacement of the elastic arm portion 23a, thus preventing the elastic arm portion 23a from being damaged.

Finally, the worker returns the unlocked lever operating portion 33 from the fitting completed position to the standby position before fitting with the mating connector 100, thus releasing the fitting between the mating connector 100 and the connector 10.

Further, if the lever 30 is rotated to the standby position before fitting with the mating connector 100 by the worker, the mating connector 100 moves to the insertion port 20a of the connector housing 20 while the pair of cams 110 and 110 is moved along the groove 20b under external force for movement by the corresponding cam groove 32b.

Thus, the worker may release the mating connector 100 from the connector, merely by opening the opening closing cover 70 without detaching the connector cover 40 from the connector 10.

The connector cover 40 according to the first embodiment of the invention is a cover that is mounted on the connector 10 having the lever 30 for assisting the fitting with and releasing from the mating connector 100 by rotation to cover a part from which the wiring member W of the connector 10 is drawn out, and includes the opening closing cover 70 that may open and close the opening O formed on the operation side of the lock portion 23 for locking the lever 30 at the fitting completed position. Thus, even when high-pressure washing water is strongly sprayed onto the connector 10, it is possible to prevent the high-pressure washing water passing through the opening O from being strongly sprayed onto the sealing member that seals the electric wire W drawn out from the connector 10 in the connector cover 40 or the outlet of the electric wire W in a waterproof manner. Consequently, even when the high-pressure washing water is strongly sprayed onto the connector 10, it is possible to prevent the waterproof sealing member sealing the wiring member W drawn out from the connector 10 or the outlet of the wiring member W in the waterproof manner from being damaged by the high-pressure washing water, and to prevent the fitting with the mating connector 100 from being inadvertently released.

Further, the assembly structure 1 of the connector with the connector cover according to the first embodiment of the invention includes the connector 10 that includes the lever 30 for assisting the fitting with and releasing from the mating connector 100 by rotation and covers the periphery of the lock portion 23 for locking the lever 30 at the fitting completed position, and the connector cover 40 that is mounted on the connector 10 to cover the part from which the wiring member W of the connector 10 is drawn out and includes the opening closing cover 70 that may open and close the opening O formed on the operation side of the lock portion 23. Thus, even when high-pressure washing water is strongly sprayed onto the connector 10, it is possible to prevent the high-pressure washing water passing through the opening O from being strongly sprayed onto the sealing member that seals the electric wire W drawn out from the connector 10 in the connector cover 40 or the outlet of the electric wire W in a waterproof manner. In addition, it is possible to cover the connector cover 40 and the periphery of the lock portion 23 in a wide range. Consequently, even when the high-pressure washing water is strongly sprayed onto the connector 10, it is possible to prevent the waterproof sealing member sealing the wiring member W drawn out from the connector 10 or the outlet of the wiring member W in the waterproof manner from being damaged by the high-pressure washing water, and to prevent the fitting with the mating connector 100 from being inadvertently released.

In the assembly structure 1 of the connector with the connector cover according to the first embodiment of the invention, in the state where the connector cover 40 is completely mounted on the connector 10, the pair of misalignment preventing ribs 58 and 58 are disposed to sandwich the arm excessive displacement preventing wall portion 24 for preventing the excessive displacement of the elastic arm portion 23a between both sides, and the opening closing cover 70 sandwiches the misalignment preventing rib 58 and 58, thus preventing the pair of misalignment preventing rib 58 and 58 from being deformed and increasing an interval therebetween. As a result, it is possible to prevent a position where the connector cover 40 is attached to the connector 10 from being deviated.

Further, in the assembly structure 1 of the connector with the connector cover according to the first embodiment of the invention, if the lever operating portion 33 is locked to the fitting completed position, the opening O formed on the operation side of the lock portion 23 locking the lever 30 and the periphery of the lock portion 23 may be covered in a wide range by three components that function respectively as the lever 30, the opening closing cover, and the arm excessive displacement preventing wall portion 24, so that the arm excessive displacement preventing wall portion 24 is brought into contact with the lever 30 and the opening closing cover 70, respectively, between the lever 30 and the opening closing cover 70.

Next, a connector cover 41 and an assembly structure 2 of a connector with a connector cover according to the second embodiment of the invention will be described with reference to FIGS. 7A to 9B.

Figure 7A:
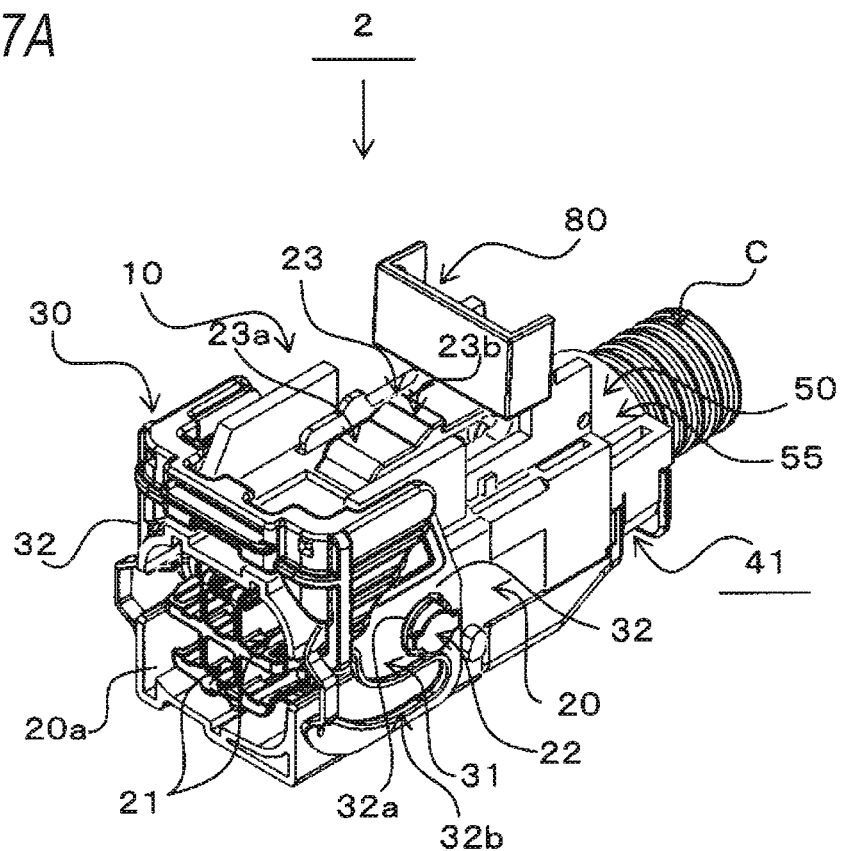
FIGS. 7A and 7B are views of a connector equipped with a connector cover according to a second embodiment of the invention as viewed from two directions, in which an opening closing cover is open.
Figure 7B:
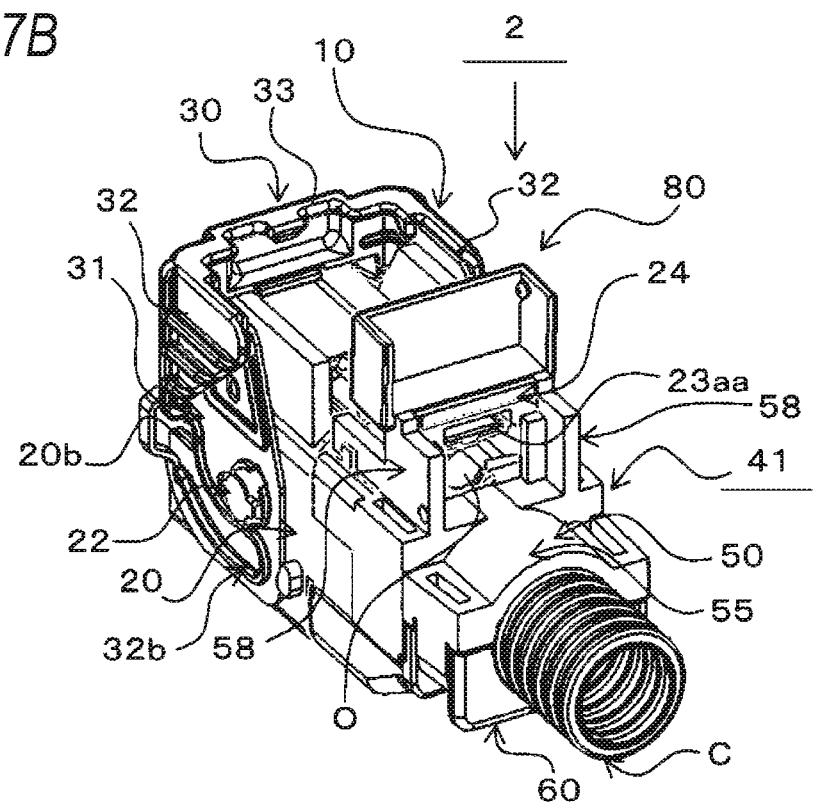
Figure 8:
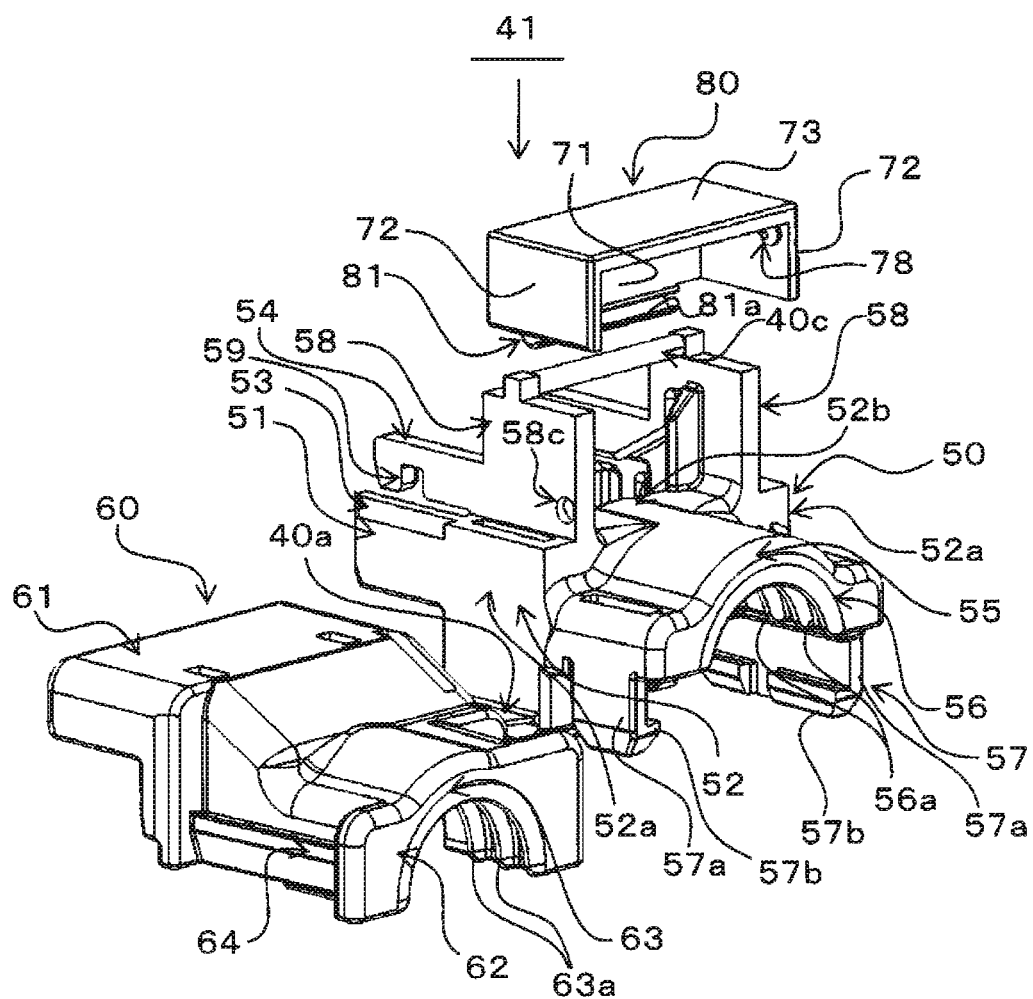
FIG. 8 is a development view of the connector cover according to the second embodiment of the invention.
Figure 9A:
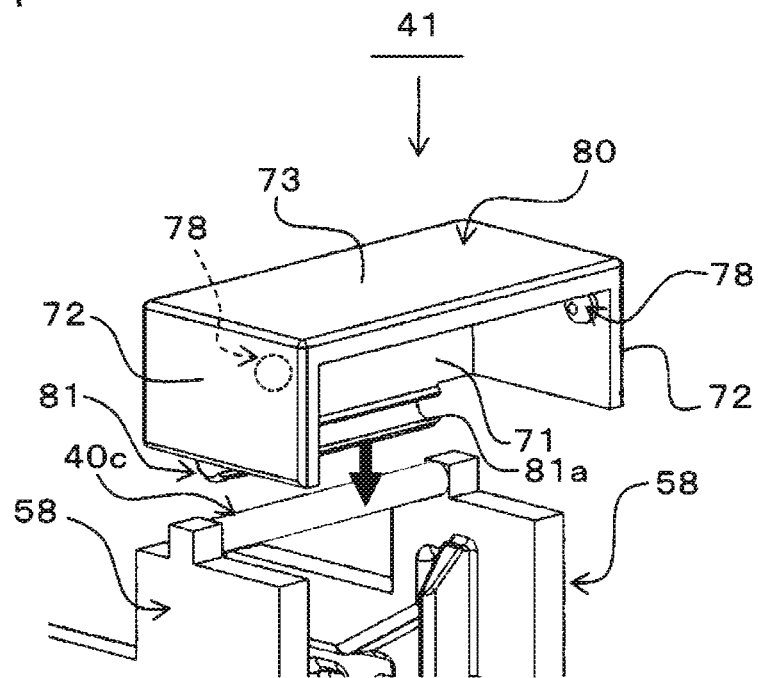
FIG. 9A is a view illustrating a state before the opening closing cover is mounted on an upper cover.
Figure 9B:
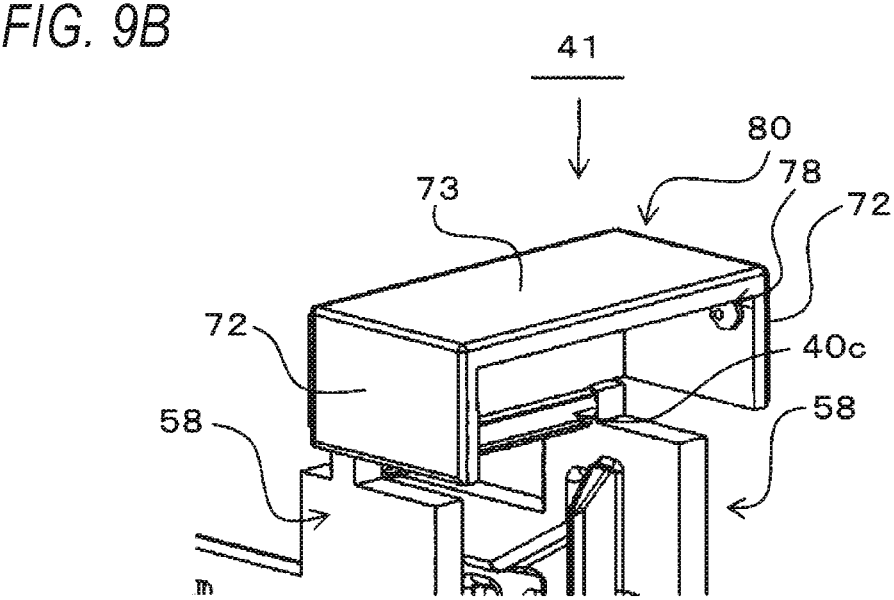
FIG. 9B is a view illustrating a state after the opening closing cover is mounted on the upper cover.

FIGS. 7A and 7B are views of the connector 10 equipped with the connector cover 41 according to the second embodiment of the invention as viewed from two directions, in which an opening closing cover 80 is open. FIG. 8 is a development view of the connector cover 41 according to the second embodiment of the invention. FIG. 9A is a view illustrating a state before the opening closing cover 80 is mounted on an upper cover 50, and FIG. 9B is a view illustrating a state after the opening closing cover 80 is mounted on the upper cover 50.

The connector cover 41 and the assembly structure 2 of the connector with the connector cover according to the second embodiment of the invention is different from the connector cover 40 and the assembly structure 1 of the connector with the connector cover according to the first embodiment in that the opening closing cover 80 is rotatably supported by a shaft 40c provided on the upper cover 50. The remaining configuration is the same as that of the first embodiment, so that components common to both the embodiments will carry the same reference numerals, and a description thereof will be omitted herein.

The assembly structure 2 of the connector with the connector cover according to the second embodiment of the invention is mounted on a vehicle, for example.

The assembly structure 2 of the connector with the connector cover includes the connector 10, the connector cover 41, and the corrugated tube C.

First, the connector 10 will be described.

The connector 10 includes a connector housing 20, a lever 30, a terminal (not shown) connected to a termination point of an electric wire W.

The connector housing 20 includes the shaft 40c that rotatably supports the opening closing cover 80.

The shaft 40c is provided on upper ends of the pair of misalignment preventing ribs 58 and 58 provided on the upper cover 50 to bridge a gap between the pair of misalignment preventing ribs 58 and 58.

The opening closing cover 80 is supported by the shaft 40c to open or close the opening O that is formed on the operation side of the lock portion 23 for locking the lever 30 to the fitting completed position.

The opening closing cover 80 includes a ceiling wall 71, a pair of sidewalls 72 that are erected on both ends of the ceiling wall 71 to face each other, a rear end wall 73 that is provided on a rear end of the ceiling wall 71, a pair of closing-cover-side lock protrusion 78 and 78 that are locked to a pair of misalignment preventing ribs 58 and 58 to be fixed, and a shaft mounting portion 81 that is mounted on the shaft 40c.

In the shaft mounting portion 81, an inner circumferential surface having an arc-shaped section corresponding to the shape of an outer circumferential surface of the shaft 40c is formed as an attaching surface to the shaft 40c. Thus, as illustrated in FIGS. 9A and 9B, the shaft mounting portion is fitted over the shaft 40c from a slit 81a that is elastically opened.

Next, a step of fitting the connector 10 with the mating connector 100 after mounting the connector cover 41 on the connector 10 will be described with reference to FIGS. 10A to 10F.

FIGS. 10A to 10F are views illustrating a state of closing the opening closing cover 80 and a state of fitting the connector 10 and the mating connector 100 by operating a lever, and figures aligned to the right and left are views of the same state as viewed from different directions Since the step of mounting the connector cover 41 on the connector 10 remains the same as that of the first embodiment, a description thereof will be omitted herein.

After mounting the connector cover 41 on the connector 10, as illustrated in FIGS. 10A, 10B, 10C, and 10D, the worker rotates the opening closing cover 80 rotatably supported on the upper cover 50 by the shaft 40c around the shaft 40c to fix it to the upper cover 50.

Here, the worker engages the pair of closing-cover-side lock protrusions 78 and 78 of the opening closing cover 80 with a pair of lock concave portions 58c and 58c of the pair of misalignment preventing ribs 58 and 58, thus fixing the opening closing cover 80 to the pair of misalignment preventing ribs 58 and 58.

By fixing the opening closing cover 80 to the upper cover 50 in this way, the opening O formed on the operation side of the lock portion 23 for locking the lever 30 at the fitting completed position is blocked.

Figure 10A:
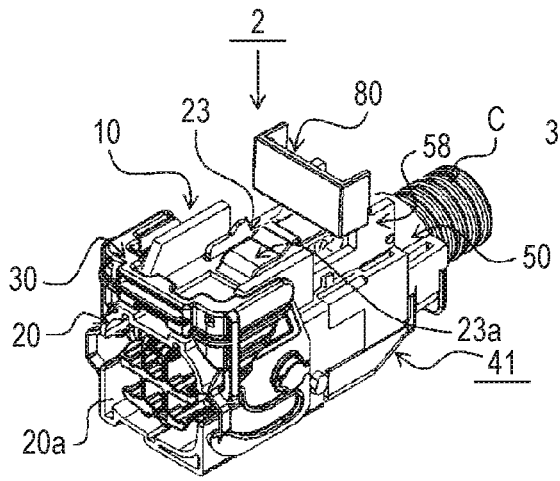
FIGS. 10A to 10F are views illustrating a state of closing the opening closing cover and a state of fitting the connector and the mating connector by operating a lever, and figures aligned to the right and left are views of the same state as viewed from different directions.
Figure 10B:
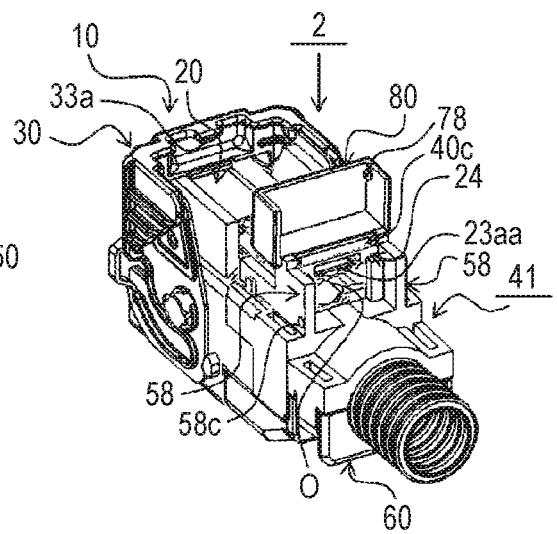
Figure 10C:
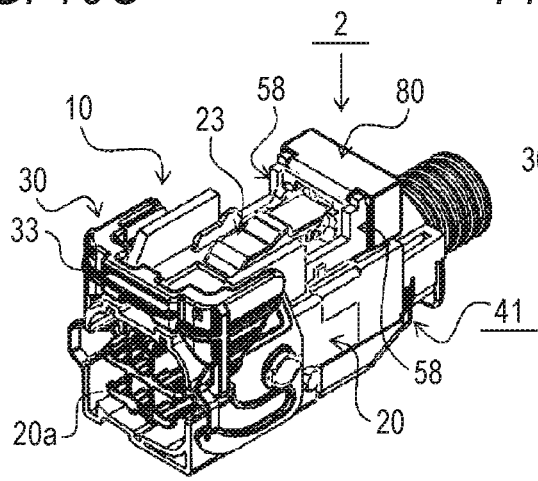
Figure 10D:
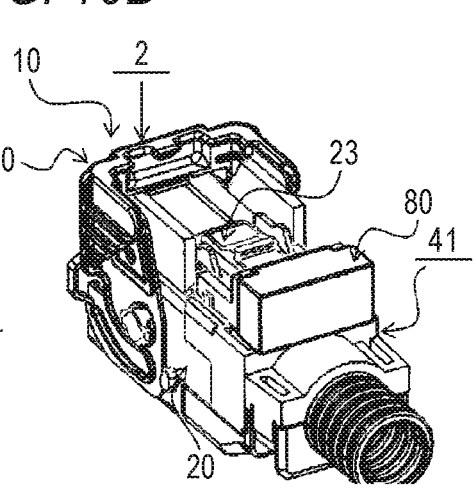
Figure 10E:
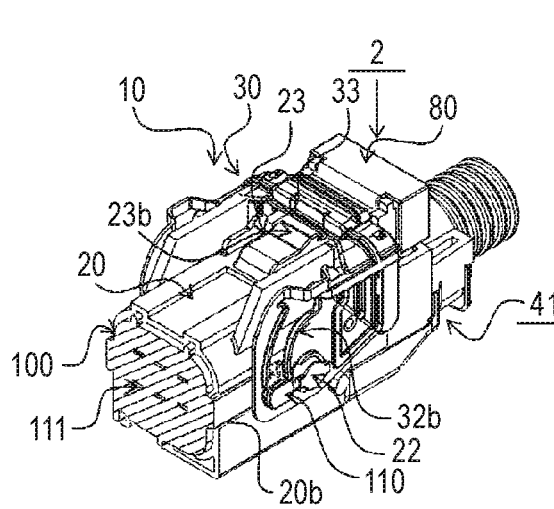
Figure 10F:
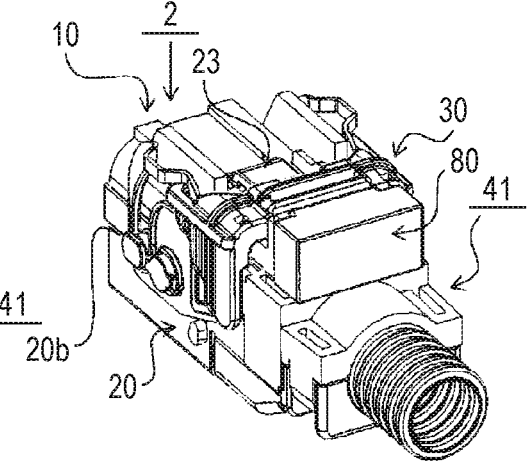

Finally, as illustrated in FIGS. 10E and 10F, the worker rotates the lever 30 at the fitting completed position, so that the connector 10 and the mating connector 100 are fitted with each other.

Here, the worker puts the mating connector 100 from the insertion port 20a of the connector 10 into the connector housing 20 until the pair of cams 110 and 110 of the mating connector 100 is fitted through the pair of grooves 20b and 20b formed on the connector housing 20 into inlets of the pair of cam grooves 32b and 32b of the lever 30, and then rotates the lever operating portion 33 to the fitting completed position where locking is performed by the lock portion 23.

If the lever operating portion 33 is located at the fitting completed position, the locking piece 33a is caught by the lock protrusion 23b of the lock portion 23, so that the lever operating portion 33 is locked at the fitting completed position.

Meanwhile, if the lever 30 is rotated to the fitting completed position by the worker, the mating connector 100 moves to the fitting completed position in the connector housing 20 while the pair of cams 110 and 110 is moved along the groove 20b under external force for movement by the corresponding cam groove 32b.

Further, if the lever operating portion 33 is located at the fitting completed position, the opening O formed on the operation side of the lock portion 23 locking the lever 30 and the periphery of the lock portion 23 are covered in a wide range by three components that function respectively as the lever 30, the opening closing cover 80, and the arm excessive displacement preventing wall portion 24, so that the arm excessive displacement preventing wall portion 24 is brought into contact with the lever 30 and the opening closing cover 80, respectively, between the lever 30 and the opening closing cover 80.

Next, a step of releasing the mating connector 100 from the connector 10 will be described.

First, the worker releases the pair of closing-cover-side lock protrusions 78 and 78 of the opening closing cover 80 from the pair of lock concave portions 58c and 58c of the pair of misalignment preventing ribs 58 and 58, and rotates the opening closing cover 80 in a reverse direction when fixed to the pair of misalignment preventing ribs 58 and 58 around the shaft 40c, thus opening the opening O formed on the operation side of the lock portion 23.

Thereafter, the worker inserts a finger or a jig through the opening O, and bends the elastic arm portion 23a of the lock portion 23 in a direction in which the lever 30 is unlocked.

Meanwhile, when the elastic arm portion 23a is deflected in the direction opposite to the direction in which the lock is released by external force, the arm excessive displacement preventing wall portion 24 prevents the excessive displacement of the elastic arm portion 23a, thus preventing the elastic arm portion 23a from being damaged.

Finally, the worker returns the unlocked lever operating portion 33 from the fitting completed position to the standby position before fitting with the mating connector 100, thus releasing the fitting between the mating connector 100 and the connector.

Further, if the lever 30 is rotated to the standby position before fitting with the mating connector 100 by the worker, the mating connector 100 moves to the insertion port 20a of the connector housing 20 while the pair of cams 110 and 110 is moved along the groove 20b under external force for movement by the corresponding cam groove 32b.

Thus, the worker may release the mating connector 100 from the connector, merely by opening the opening closing cover 80 without detaching the connector cover 41 from the connector 10.

Similarly to the connector cover 40 of the first embodiment, the connector cover 41 according to the second embodiment of the invention is a cover that is mounted on the connector 10 having the lever 30 for assisting the fitting with and releasing from the mating connector 100 by rotation to cover a part from which the wiring member W of the connector 10 is drawn out, and includes the opening closing cover 70 that may open and close the opening O formed on the operation side of the lock portion 23 for locking the lever 30 at the fitting completed position. Thus, even when high-pressure washing water is strongly sprayed onto the connector 10, it is possible to prevent the high-pressure washing water passing through the opening O from being strongly sprayed onto the sealing member that seals the wiring member W drawn out from the connector 10 in the connector cover 41 or the outlet of the wiring member W in a waterproof manner. Consequently, even when the high-pressure washing water is strongly sprayed onto the connector 10, it is possible to prevent the waterproof sealing member sealing the wiring member W drawn out from the connector 10 or the outlet of the wiring member W in the waterproof manner from being damaged by the high-pressure washing water, and to prevent the fitting with the mating connector 100 from being inadvertently released.

Further, similarly to the assembly structure 1 of the connector with the connector cover according to the first embodiment, the assembly structure 2 of the connector with the connector cover according to the second embodiment of the invention includes the connector 10 that includes the lever 30 for assisting the fitting with and releasing from the mating connector 100 by rotation and covers the periphery of the lock portion 23 for locking the lever 30 at the fitting completed position, and the connector cover 41 that is mounted on the connector 10 to cover the part from which the wiring member W of the connector 10 is drawn out and includes the opening closing cover 80 that may open and close the opening O formed on the operation side of the lock portion 23. Thus, even when high-pressure washing water is strongly sprayed onto the connector 10, it is possible to prevent the high-pressure washing water passing through the opening O from being strongly sprayed onto the sealing member that seals the electric wire W drawn out from the connector 10 in the connector cover 41 or the outlet of the electric wire W in a waterproof manner. In addition, it is possible to cover and the periphery of the lock portion 23 in a wide range. Consequently, even when the high-pressure washing water is strongly sprayed onto the connector 10, it is possible to prevent the waterproof sealing member sealing the wiring member W drawn out from the connector 10 or the outlet of the wiring member W in the waterproof manner from being damaged by the high-pressure washing water, and to prevent the fitting with the mating connector 100 from being inadvertently released.

Next, a connector cover 42 and an assembly structure 3 of a connector with a connector cover according to a third embodiment of the invention will be described with reference to FIGS. 11 to 13C.

Figure 11:
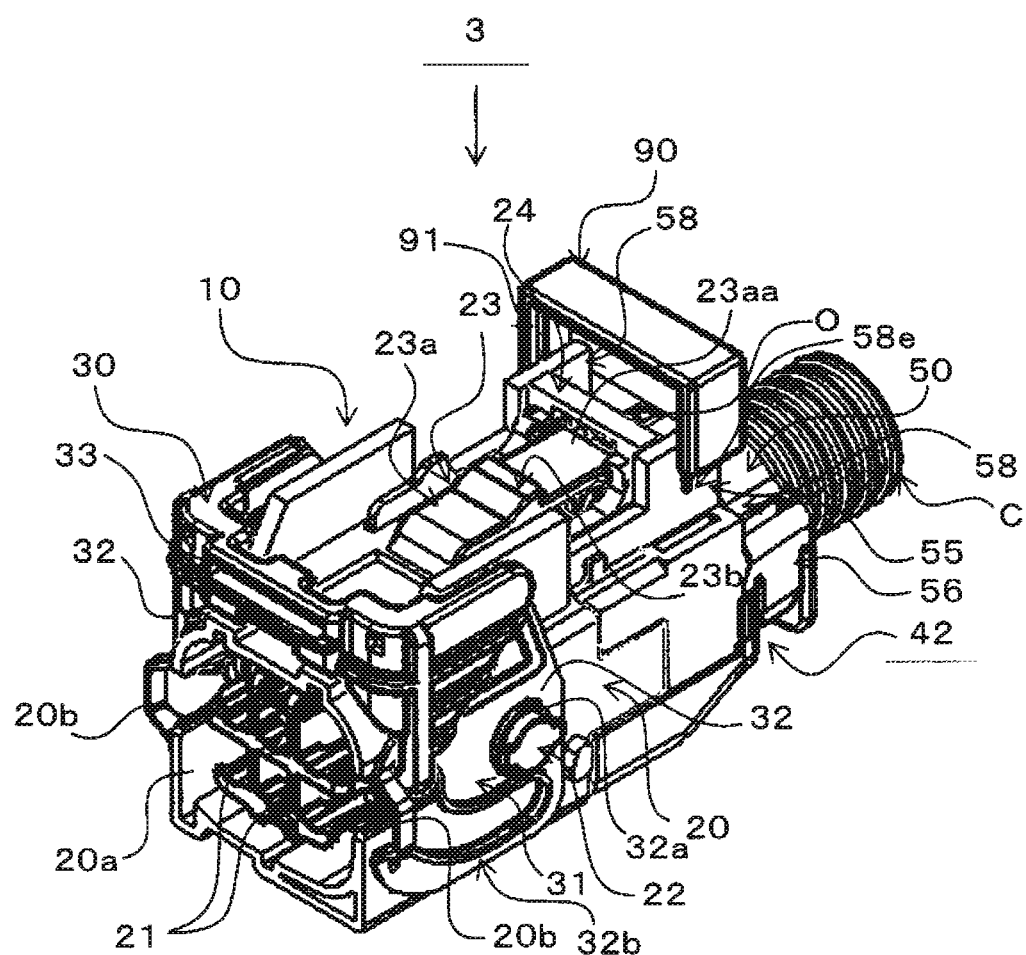
FIG. 11 is a view of a connector equipped with a connector cover according to a third embodiment of the invention, in which an opening closing cover is open.
Figure 12A:
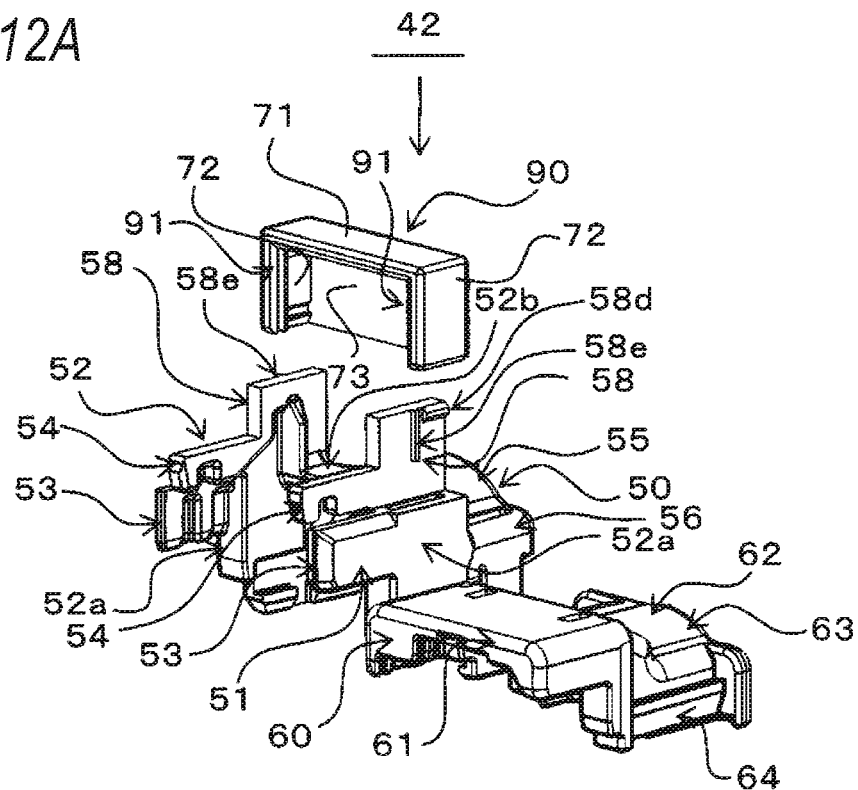
FIG. 12A is a development view of the connector cover according to the third embodiment of the invention.
Figure 12B:
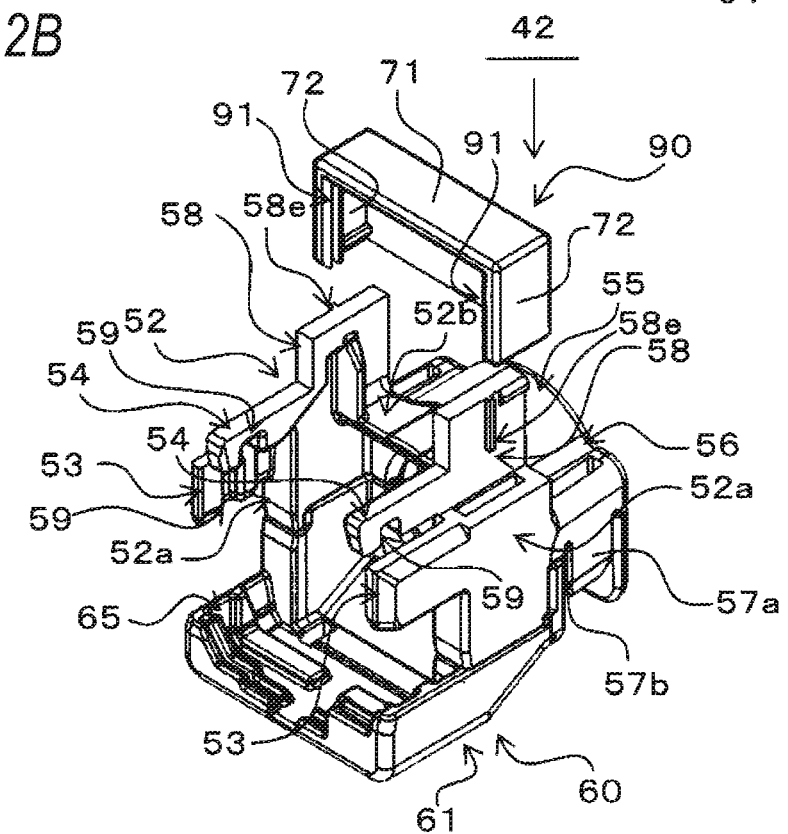
FIG. 12B is a view illustrating a state where an upper cover and a lower cover of the connector cover shown in FIG. 12A are coupled with each other.
Figure 13A:
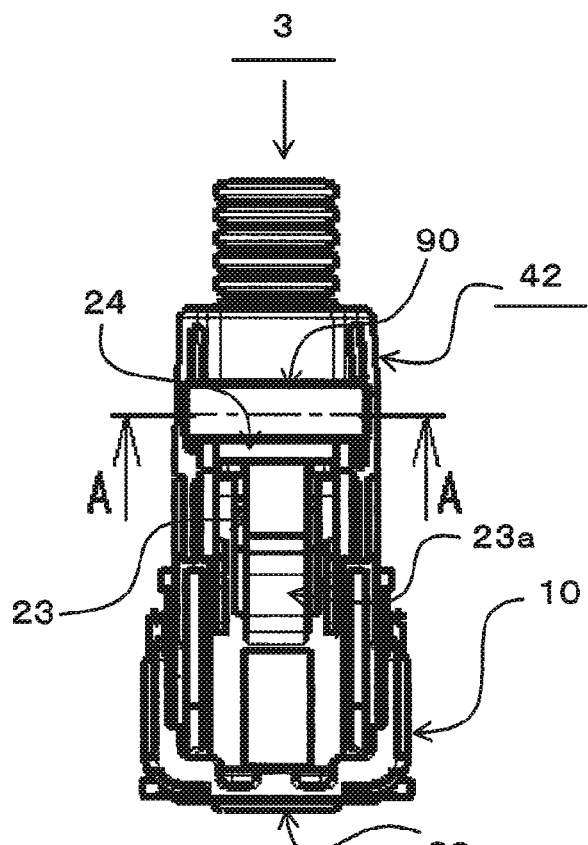
FIG. 13A is a top view illustrating the connector equipped with the connector cover.
Figure 13B:
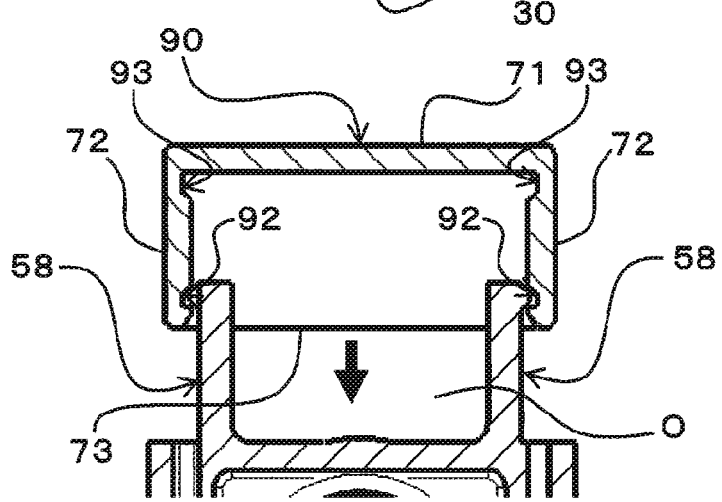
FIG. 13B is a view illustrating a state in which the opening closing cover in a cross-sectional view taken along line A-A of the connector shown in FIG. 13A is in an open position.
Figure 13C:
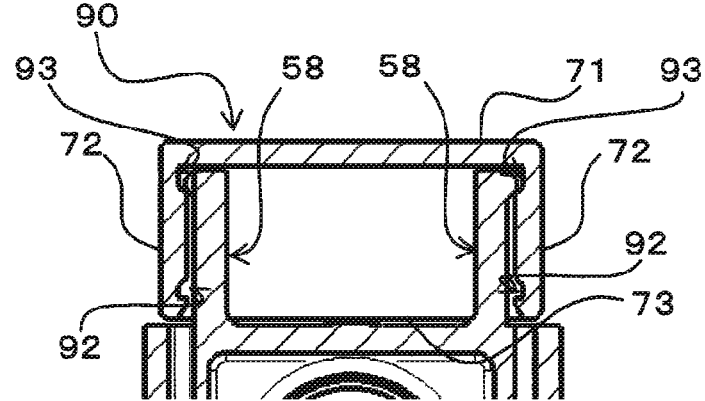
FIG. 13C is a view illustrating a state in which the opening closing cover in the cross-sectional view taken along line A-A of the connector shown in FIG. 13A is in a closed position.

FIG. 11 is a view of a connector 10 equipped with a connector cover 42 according to the third embodiment of the invention, in which an opening closing cover 90 is open. FIG. 12A is a development view of the connector cover 42 according to the third embodiment of the invention, and FIG. 12B is a view illustrating a state where an upper cover 50 and a lower cover 60 of the connector cover 42 shown in FIG. 12A are coupled with each other. FIG. 13A is a top view illustrating the connector 10 equipped with the connector cover 42, FIG. 13B is a view illustrating a state in which the opening closing cover 90 in a cross-sectional view taken along line A-A of the connector 10 shown in FIG. 13A is in an open position, and FIG. 13C is a view illustrating a state in which the opening closing cover 90 in the cross-sectional view taken along line A-A of the connector 10 shown in FIG. 13A is in a closed position.

The connector cover 42 and the assembly structure 3 of the connector with the connector cover according to the third embodiment of the invention is different from the connector cover 40 and the assembly structure 1 of the connector with the connector cover according to the first embodiment in that the opening closing cover 90 is slidably mounted on the upper cover 50.

The remaining configuration is the same as that of the first embodiment, so that components common to the first and third embodiments will carry the same reference numerals, and a description thereof will be omitted herein.

The assembly structure 3 of the connector with the connector cover according to the third embodiment of the invention is mounted on a vehicle, for example.

The assembly structure 3 of the connector with the connector cover includes the connector 10, the connector cover 42, and the corrugated tube C.

First, the connector 10 will be described.

The connector 10 includes a connector housing 20, a lever 30, a terminal (not shown) connected to a termination point of an electric wire W.

The connector housing 20 includes a pair of slide guide ribs 58e and 58e that guide the opening closing cover 90 to slidably move between an open position for opening the opening O formed on the operation side of the lock portion 23 and a closed position for closing the opening O.

Each of the slide guide ribs 58e and 58e is provided to linearly extend downward from the upper end of the outer surface of each of the misalignment preventing ribs 58.

The opening closing cover 90 slidably moves along the slide guide ribs 58e and 58e provided on the pair of misalignment preventing ribs 58 and 58, thus opening or closing the opening O formed on the operation side of the lock portion 23 for locking the lever 30 at the fitting completed position.

The opening closing cover 90 includes a ceiling wall 71, a pair of sidewalls 72 and 72 that are erected on both ends of the ceiling wall 71 to face each other, a rear end wall 73 provided on a rear end of the ceiling wall 71, a pair of slide guide grooves 91 and 91 into which the pair of slide guide ribs 58e and 58e is fitted, and two pairs of lock concave portions 92, 92, 93, and 93 that are locked by the pair of misalignment preventing ribs 58 and 58 to be fixed at the open position and the closed position.

The pair of slide guide grooves 91 and 91 extends linearly from the upper ends to the lower ends of the sidewalls 72 and 72 on the inner surfaces of the front ends of the sidewalls 72 and 72, and is formed between opposite walls having a width that is slightly larger than the width of the slide guide ribs 58e and 58e.

Of the two lock concave portions 92, 92, 93 and 93, the lock concave portions 92 and 92 on one side are provided on the inner surfaces of the lower ends of the sidewalls 72, so that they engage with the lock protrusions 58d and 58d provided on the misalignment preventing ribs 58 and 58 as illustrated in FIG. 13B, thus coupling the opening closing cover 90 to the open position.

Of the two lock concave portions 92, 92, 93 and 93, the lock concave portions 93 and 93 on the other side are provided on the inner surfaces of the upper ends of the sidewalls 72, so that they engage with the lock protrusions 58d and 58d provided on the misalignment preventing ribs 58 and 58 as illustrated in FIG. 13C, thus coupling the opening closing cover 90 to the closed position.

Next, a step of fitting the connector with the mating connector 100 after mounting the connector cover on the connector will be described with reference to FIGS. 14A to 14F.

FIGS. 14A to 14F are views illustrating a state of closing the opening closing cover 90 and a state of fitting the connector 10 and the mating connector 100 by operating a lever, and figures aligned to the right and left are views of the same state as viewed from different directions.

Since a step of mounting the connector cover 42 to the connector 10 is equal to that of the first embodiment, a detailed description thereof will be omitted herein.

After mounting the connector cover 42 on the connector 10, as illustrated in FIGS. 14A, 14B, 14C and 14D, the worker slidably moves the opening closing cover 90 coupled to the open position for opening the opening O, along the slide guide ribs 58e and 58e to be locked to a position where the opening O is closed.

By coupling the opening closing cover 90 to the closed position in this way, the opening O formed on the operation side of the lock portion 23 for locking the lever 30 at the fitting completed position is blocked.

Figure 14A:
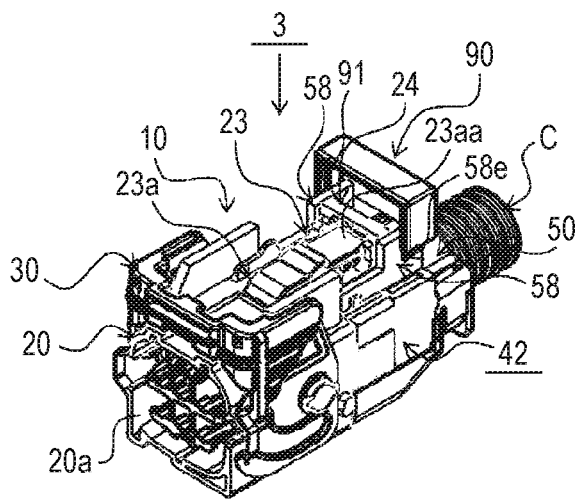
FIGS. 14A to 14F are views illustrating a state of closing the opening closing cover and a state of fitting the connector and the mating connector by operating a lever, and figures aligned to the right and left are views of the same state as viewed from different directions.
Figure 14B:
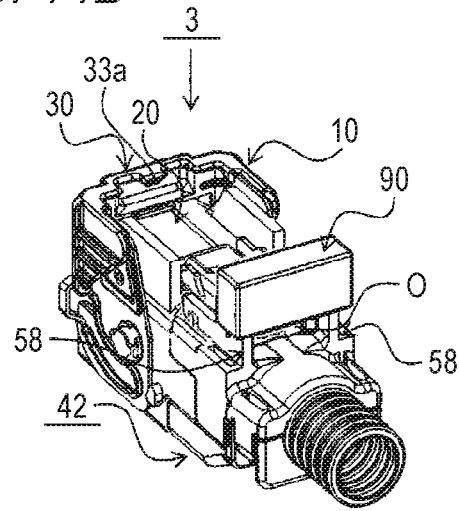
Figure 14C:
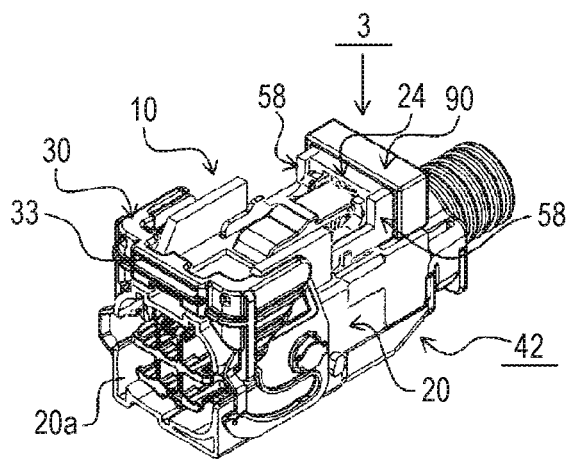
Figure 14D:
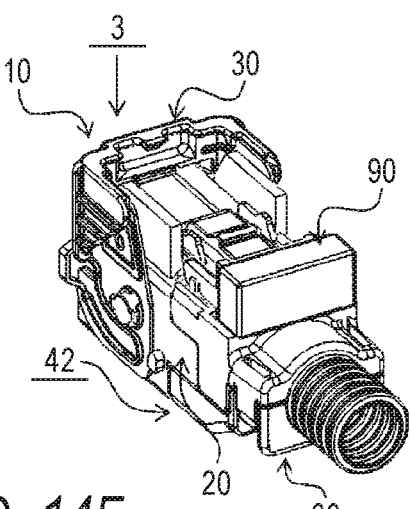
Figure 14E:
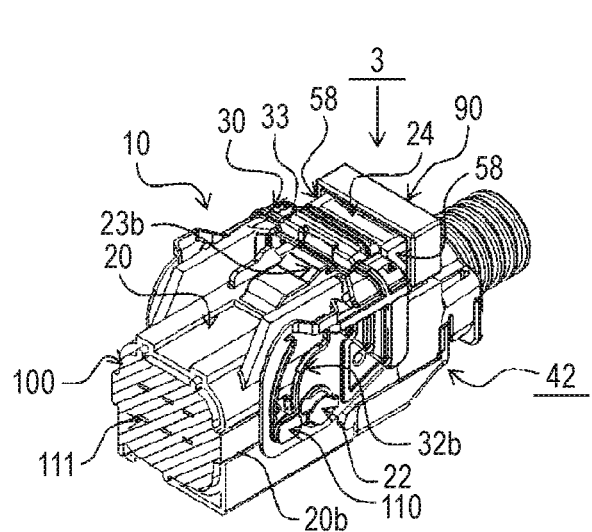
Figure 14F:
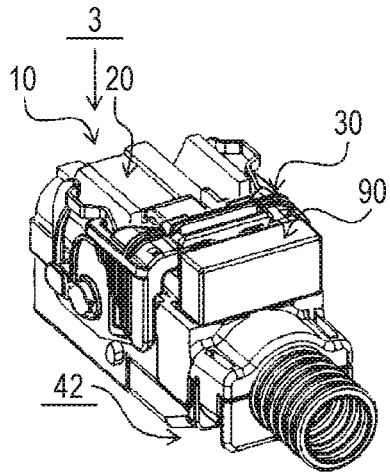

Finally, as illustrated in FIGS. 14E and 14F, the worker rotates the lever 30 at the fitting completed position, so that the connector 10 and the mating connector 100 are fitted with each other.

Here, the worker puts the mating connector 100 from the insertion port 20a of the connector 10 into the connector housing 20 until the pair of cams 110 and 110 of the mating connector 100 is fitted through the pair of grooves 20b and 20b formed on the connector housing 20 into inlets of the pair of cam grooves 32b and 32b of the lever 30, and then rotates the lever operating portion 33 to the fitting completed position where locking is performed by the lock portion 23.

If the lever operating portion 33 is located at the fitting completed position, the locking piece 33a is caught by the lock protrusion 23b of the lock portion 23, so that the lever operating portion 33 is locked at the fitting completed position.

Meanwhile, if the lever 30 is rotated to the fitting completed position by the worker, the mating connector 100 moves to the fitting completed position in the connector housing 20 while the pair of cams 110 and 110 is moved along the groove 20b under external force for movement by the corresponding cam groove 32b.

Further, if the lever operating portion 33 is located at the fitting completed position, the opening O formed on the operation side of the lock portion 23 locking the lever 30 and the periphery of the lock portion 23 are covered in a wide range by three components that function respectively as the lever 30, the opening closing cover 90, and the arm excessive displacement preventing wall portion 24, so that the arm excessive displacement preventing wall portion 24 is brought into contact with the lever 30 and the opening closing cover 90, respectively, between the lever 30 and the opening closing cover 90.

Next, a step of releasing the mating connector 100 from the connector 10 will be described.

First, the worker slidably moves the opening closing cover 90 along the pair of slide guide ribs 58e and 58e to be locked to the open position where the opening O is opened.

Thereafter, the worker inserts a finger or a jig through the opening O, and bends the elastic arm portion 23a of the lock portion 23 in a direction in which the lever 30 is unlocked.

Meanwhile, when the elastic arm portion 23a is deflected in the direction opposite to the direction in which the lock is released by external force, the arm excessive displacement preventing wall portion 24 prevents the excessive displacement of the elastic arm portion 23a, thus preventing the elastic arm portion 23a from being damaged.

Finally, the worker returns the unlocked lever operating portion 33 from the fitting completed position to the standby position before fitting with the mating connector 100, thus releasing the fitting between the mating connector 100 and the connector 10.

Further, if the lever 30 is rotated to the standby position before fitting with the mating connector 100 by the worker, the mating connector 100 moves to the insertion port 20a of the connector housing 20 while the pair of cams 110 and 110 is moved along the groove 20b under external force for movement by the corresponding cam groove 32b. Thus, the worker may release the mating connector 100 from the connector, merely by opening the opening closing cover 90 without detaching the connector cover 42 from the connector 10.

Similarly to the connector cover 40 of the first embodiment, the connector cover 42 according to the third embodiment of the invention is a cover that is mounted on the connector 10 having the lever 30 for assisting the fitting with and releasing from the mating connector 100 by rotation to cover a part from which the wiring member W of the connector 10 is drawn out, and includes the opening closing cover 90 that may open and close the opening O formed on the operation side of the lock portion 23 for locking the lever 30 at the fitting completed position. Thus, even when high-pressure washing water is strongly sprayed onto the connector 10, it is possible to prevent the high-pressure washing water passing through the opening O from being strongly sprayed onto the sealing member that seals the wiring member W drawn out from the connector 10 in the connector cover 42 or the outlet of the wiring member W in a waterproof manner. Consequently, even when the high-pressure washing water is strongly sprayed onto the connector 10, it is possible to prevent the waterproof sealing member sealing the wiring member W drawn out from the connector 10 or the outlet of the wiring member W in the waterproof manner from being damaged by the high-pressure washing water, and to prevent the fitting with the mating connector 100 from being inadvertently released.

Further, similarly to the assembly structure 1 of the connector with the connector cover according to the first embodiment, the assembly structure 3 of the connector with the connector cover according to the third embodiment of the invention includes the connector 10 that includes the lever 30 for assisting the fitting with and releasing from the mating connector 100 by rotation and covers the periphery of the lock portion 23 for locking the lever 30 at the fitting completed position, and the connector cover 42 that is mounted on the connector 10 to cover the part from which the wiring member W of the connector 10 is drawn out and includes the opening closing cover 90 that may open and close the opening O formed on the operation side of the lock portion 23. Thus, even when high-pressure washing water is strongly sprayed onto the connector 10, it is possible to prevent the high-pressure washing water passing through the opening O from being strongly sprayed onto the sealing member that seals the electric wire W drawn out from the connector 10 in the connector cover 42 or the outlet of the electric wire W in a waterproof manner. In addition, it is possible to cover the connector cover 42 and the periphery of the lock portion 23 in a wide range. Consequently, even when the high-pressure washing water is strongly sprayed onto the connector 10, it is possible to prevent the waterproof sealing member sealing the wiring member W drawn out from the connector 10 or the outlet of the wiring member W in the waterproof manner from being damaged by the high-pressure washing water, and to prevent the fitting with the mating connector 100 from being inadvertently released.

Although it is exemplified in the connector covers 40, 41 and 42 and the assembly structures 1, 2 and 3 of the connector with the connector cover according to the first, second and third embodiments of the invention such that the lock portion 23 includes the elastic arm portion 23a, other lock structures may be possible, without being limited thereto, as long as the lever 30 is locked at the fitting completed position and is unlocked from the opening O that may be opened or closed by the opening closing covers 70, 80 and 90.

Further, although it is exemplified such that the assembly structures 1, 2 and 3 of the connector with the connector cover according to the first, second and third embodiments of the invention include the arm excessive displacement preventing wall portion 24, the arm excessive displacement preventing wall portion 24 may be omitted without being limited thereto. That is, in the assembly structures 1, 2 and 3 of the connector with the connector cover, at least the lever 30 covers the periphery of the lock portion 23 at the fitting completed position, as long as the opening closing cover 70, 80, 90 may open or close the opening O formed on the operation side of the lock portion 23.

Although preferred embodiments of the invention have been described for illustrative purposes, those skilled in the art will appreciate that various modifications, additions and substitutions are possible, without departing from the scope and spirit of the invention as disclosed in the accompanying claims.

DESCRIPTION OF REFERENCE NUMERALS AND SIGNS

1, 2, 3: assembly structure of connector with connector cover
10: connector
20: connector housing
20*a*: insertion port
20*b*: groove
20*c*: fitting concave portion
21: terminal accommodating chamber
21*a*: mating terminal insertion port
21*b*: terminal insertion port
22: rotating shaft
23: lock portion
23*a*: elastic arm portion
23*b*: lock protrusion
23*c*: abutting protrusion
24: arm excessive displacement preventing wall portion
24*a*: wall body
24*aa*: surface
24*b*: stopper portion
25: housing-side engaging portion
30: lever
31: lever body portion
32: lever-body wall portion
32*a*: rotating-shaft hole
32*b*: cam groove
33: lever operating portion
33*a*: locking piece
40, 41, 42: connector cover
40*a*, 40*b*: hinge portion
40*c*: shaft
50: upper cover
51: connecting portion
52: connecting body portion
52*a*: side cover wall
52*b*: ceiling cover wall
53: first connecting piece
54: second connecting piece
55: tube accommodating portion
56: accommodating body
56*a*: protrusion
57: coupling lock portion
57*a*: elastic arm portion
57*b*: coupling lock protrusion
58: misalignment preventing rib
58*a*, 58*b*: rib-side lock protrusion
58*c*: lock concave portion
58*d*: lock protrusion
58*e*: slide guide rib
59: cover-side engaging portion
60: lower cover
61: connecting portion
62: tube accommodating portion
63: accommodating body
63*a*: protrusion
64: coupling lock protrusion
65: cover-side engaging portion
70, 80, 90: opening closing cover
71: ceiling wall
72: sidewall
73: rear end wall
74, 75, 78: closing-cover-side lock protrusion
76: projection
81: shaft mounting portion
81*a*: slit
91: slide guide groove
92, 93: lock concave portion
100: mating connector
110: cam
111: mating terminal
C: corrugated tube
O: opening
W: electric wire (wiring member)

What is claimed is:

1. A connector cover comprising:
   an opening closing cover,
   wherein the connector cover is configured to be mounted on a connector so as to cover a part of the connector from which a wiring member is drawn out,
   wherein the connector includes a lever to be rotated so as to assist fitting with and releasing from a mating connector, and
   wherein the opening closing cover is to open and close an opening on an operation side of a lock portion which locks the lever at a fitting completed position.

2. An assembly structure of a connector with a connector cover, comprising:
   a connector;
   a connector cover,
   wherein the connector includes a lever to be rotated so as to assist fitting with and releasing from a mating connector and covers a periphery of a lock portion which locks the lever at a fitting completed position,
   wherein the connector cover is mounted on the connector so as to cover a part of the connector from which a wiring member is drawn out, and
   wherein the connector cover includes an opening closing cover which is to open and close an opening on an operation side of the lock portion.

3. The assembly structure according to claim 2,
   wherein the lock portion includes an elastic arm portion having a free end on an end of a drawing direction of the wiring member of the connector,
   wherein the elastic arm portion is elastically deformed from and restored to a fixed end of the elastic arm portion as a fulcrum so that the lever is locked and unlocked,
   wherein the connector includes an arm excessive displacement preventing wall portion that is erected in a shape of a bridge to surround the free end from both sides to an upper surface, so as to prevent excessive displacement of the elastic arm portion, wherein the connector cover includes a pair of misalignment preventing ribs that are arranged to sandwich the arm excessive displacement preventing wall portion between both side end surfaces when the connector cover is completely mounted on the connector, so as to prevent deviation of the connector cover from the connector, and wherein the opening closing cover is fixed to the pair of misalignment preventing ribs to sandwich the pair of misalignment preventing ribs in a direction that the misalignment preventing ribs face each other.

4. The assembly structure according to claim 3, wherein the arm excessive displacement preventing wall portion is disposed between the lever locked by the lock portion at a fitting completed position and the opening closing cover and is in contact with the lever and the opening closing cover.

* * * * *